United States Patent
Green

(10) Patent No.: US 10,181,725 B2
(45) Date of Patent: Jan. 15, 2019

(54) METHOD FOR OPERATING AT LEAST ONE DISTRIBUTED ENERGY RESOURCE COMPRISING A REFRIGERATION SYSTEM

(71) Applicant: DANFOSS A/S, Nordborg (DK)

(72) Inventor: Torben Green, Aabenraa (DK)

(73) Assignee: DANFOSS A/S, Nordborg (DK)

( * ) Notice: Subject to any disclaimer, the term of this patent is extended or adjusted under 35 U.S.C. 154(b) by 0 days.

(21) Appl. No.: 15/508,530

(22) PCT Filed: Nov. 18, 2015

(86) PCT No.: PCT/IB2015/058917
§ 371 (c)(1),
(2) Date: Mar. 3, 2017

(87) PCT Pub. No.: WO2016/079686
PCT Pub. Date: May 26, 2016

(65) Prior Publication Data
US 2017/0288402 A1     Oct. 5, 2017

(30) Foreign Application Priority Data

Nov. 19, 2014 (EP) ..................... 14193949
Mar. 13, 2015 (EP) ..................... 15159043

(51) Int. Cl.
*H02J 3/14* (2006.01)
*F25B 5/02* (2006.01)
(Continued)

(52) U.S. Cl.
CPC .................. *H02J 3/14* (2013.01); *F25B 5/02* (2013.01); *F25B 49/02* (2013.01); *F25D 29/00* (2013.01);
(Continued)

(58) Field of Classification Search
CPC ......... H02J 3/14; H02J 2003/003; F25B 5/02; F25B 49/02; F25B 2400/22;
(Continued)

(56) References Cited

U.S. PATENT DOCUMENTS 8,178,997 B2   5/2012   Talkin et al.
9,263,891 B2   2/2016   Jensen et al.
(Continued)

FOREIGN PATENT DOCUMENTS

EP   2 804 279 A1   11/2014
GB   2482426 A       2/2012
(Continued)

OTHER PUBLICATIONS

International Search Report for PCT Serial No. PCT/IB2015/058917 dated Jan. 27, 2016.
(Continued)

*Primary Examiner* — Frantz Jules
*Assistant Examiner* — Steve Tanenbaum
(74) *Attorney, Agent, or Firm* — McCormick, Paulding & Huber LLP

(57) ABSTRACT

The invention relates to a method of operating at least one distributed energy resource comprising a refrigeration system (1) with a number of cooling entities, wherein a power consumption information is communicated to a smart-grid setup (SG). According to the invention the method comprises the steps of: requesting (S0) a power consumption information from the refrigeration system; transmitting (S1) the power consumption information from the refrigeration system (1), wherein a total amount of power consumption (Pmin, Pmax) of the refrigeration system (1) is provided; wherein: a cooling capacity ($dQ/dt\_i$) of at least one cooling entity is determined wherein an entity operation condition
(Continued)

(CE) of the cooling entity (E1, E2) is taken into account (D1); a power consumption ($W\_i$) of at least one cooling entity (E1, E2) is determined from the cooling capacity ($dQ/dt\_i$) wherein a performance estimation (COP) of a refrigeration cycle for the cooling entity (E1, E2) is taken into account (D2); providing (D3) the total amount of power consumption (Pmin, Pmax) as a sum of power consumptions ($W\_i$) of at least the one cooling entity of the number of cooling entities (E1, E2), in particular as a sum of relevant power consumptions of the number of cooling entities (E1, E2); receiving (S2) at the refrigeration system (1) a power reference (Wref) from the smart-grid setup (SG). The method presented enables power control of a centralized refrigeration system in a smart-grid setup where an aggregator provides the power reference. In addition, the method also enables the refrigeration system to improve determining flexibility margins beyond absolute max./min values of nominal and zero.

20 Claims, 5 Drawing Sheets

(51) Int. Cl.
| | | |
|---|---|---|
| *F25B 49/02* | (2006.01) | |
| *F25D 29/00* | (2006.01) | |
| *H02J 3/00* | (2006.01) | |

(52) U.S. Cl.
CPC ..... *F25B 2400/06* (2013.01); *F25B 2400/075* (2013.01); *F25B 2400/22* (2013.01); *F25B 2500/19* (2013.01); *F25B 2600/024* (2013.01); *F25B 2600/2513* (2013.01); *F25B 2700/1933* (2013.01); *F25B 2700/2104* (2013.01); *H02J 2003/003* (2013.01); *H02J 2003/143* (2013.01); *Y02B 30/765* (2013.01); *Y02B 70/3225* (2013.01); *Y02B 70/3266* (2013.01); *Y02B 70/3275* (2013.01); *Y04S 20/222* (2013.01); *Y04S 20/242* (2013.01); *Y04S 20/244* (2013.01)

(58) Field of Classification Search
CPC ...... F25B 2600/2513; F25B 2700/2104; F25B 2500/19; F25B 2400/075; F25B 41/043; F25B 49/022; F25B 2600/2521; F25B 2600/0251; F25B 2700/21171
USPC ............................................. 62/129; 700/291
See application file for complete search history.

(56) References Cited

U.S. PATENT DOCUMENTS

| | | |
|---|---|---|
| 2009/0048717 A1 | 2/2009 | Richard et al. |
| 2010/0314942 A1 | 12/2010 | Talkin et al. |
| 2011/0175742 A1* | 7/2011 | Shin ...................... F25D 17/065 340/635 |
| 2011/0264286 A1 | 10/2011 | Park |
| 2013/0178993 A1* | 7/2013 | Rombouts .............. G05B 13/02 700/291 |
| 2014/0246909 A1* | 9/2014 | Todorski ................. H02J 3/008 307/31 |

FOREIGN PATENT DOCUMENTS

| | | |
|---|---|---|
| WO | 2010/069316 A1 | 6/2010 |
| WO | 2013/105323 A1 | 7/2013 |

OTHER PUBLICATIONS

Binding et al., "FlexLast: An IT-Centric Solution for Balancing the Electric Power Grid", IECON 2013—39th Annual conference of the IEEE Industrial Electronics Society, Nov. 10, 2013, p. 4751-4755.
Supplementary European Search Report for Serial No. EP 15 86 1842 dated Apr. 25, 2018.

* cited by examiner

METHOD FOR OPERATING AT LEAST ONE DISTRIBUTED ENERGY RESOURCE COMPRISING A REFRIGERATION SYSTEM

CROSS-REFERENCE TO RELATED APPLICATIONS

This application is a National Stage application of International Patent Application No. PCT/IB2015/058917, filed on Nov. 18, 2015, which claims priority to European Patent Application No. 14193949.6, filed on Nov. 19, 2014, and European Patent Application No. 15159043.7, filed on Mar. 13, 2015, each of which is hereby incorporated by reference in its entirety.

TECHNICAL FIELD

The invention relates to a method of operating at least one distributed energy resource comprising a refrigeration system with a number of cooling entities, wherein power consumption information is communicated to an aggregator of a smart-grid setup. The invention further relates to a power control unit adapted for communicating a power consumption information to a smart-grid setup.

BACKGROUND

In a smart-grid or demand response setup, where an aggregator is directly controlling various distributed energy resources (DER) using power references, there will be a requirement for a power controller with estimation of flexibility for each of the distributed energy resources. The schematic of the information flow in smart-grid setup can be seen in FIG. 1. The task of the aggregator is to provide the electrical grid with some kind of regulation service which is traded through the market place.

For the aggregator to be able to provide regulation services it has to be able to control a portfolio of DERs, which can be both production and consumption units, the only requirement is that the DER has to be controllable from the aggregator. An example of a DER is a refrigeration system where the heat capacity of the stored goods is used to time shift power consumption and thereby assist the aggregator in providing regulation services to the electrical grid.

A method of U.S. Pat. No. 8,178,997 includes determining a desired power draw for a plurality of loads connected to an electrical grid, each of the plurality of loads connected to the electrical grid through a load supply control and being able to obtain a desired amount of energy from the grid in a desired time period, and transmitting a plurality of instructions through a communication network to a plurality of load supply controls to cause at least some of the loads in the plurality of loads to receive power from the electrical grid at different rates than other loads of the plurality of loads such that the desired power draw is obtained and such that each load of the plurality of loads receives its corresponding desired amount of energy in the desired time period. The plurality of loads can include certain implementations and may have one or more of the plurality of batteries or battery chargers, a plurality of hot water heaters, a plurality of refrigeration compressors, a plurality of dishwashers, a plurality of clothes dryers, a plurality of ice makers, or a plurality of swimming pool pumps. The plurality of batteries or battery chargers can include a plurality of batteries or battery chargers for plug-in vehicles. The method can further include determining, for each load, a rate of power draw required for the load to obtain its desired amount of energy in the desired time period. The desired amount of energy and the desired time period can be based upon a user input.

To provide regulation, i.e. response to short-term fluctuations, the aggregator or computer system of the aggregator can estimate the amount of power modulation achievable over the longest duration. In this case, the aggregator or by the aggregator or computer system of the aggregator from the controllable loads for any interval, called the assessment interval, during which some loads, called the active ensemble or managed ensemble of loads, are connected or can reasonably be expected to be connected. For this example, it is assumed that the aggregator or computer system of the aggregator can signal the loads to turn only on or off. However, the aggregator or computer system of the aggregator has the potential to continuously adjust the power drawn by each load rather than turning the loads on and off. This would allow the aggregator or computer system of the aggregator an additional degree of freedom in scheduling the power distribution on the loads.

The above prior art procedure of managing a portfolio of various kinds of DERs has turned out to be inadequate for the needs of a refrigeration system of a general kind.

More specifically, WO2010/069316 A1 relates to a method and a system to reduce losses of energy due to ripples, especially at the power grid, the ripples being short term power shortages or excess power. The method is based on the idea of shutting off energy consuming devices during a period of power shortage, if their operation is not necessary, and optionally to turn on such energy consuming devices during periods of excess power, if energy may be stored in them, especially when energy may be stored as some physical parameter or variable, being a part of the operation of the energy consuming devices, such as the temperature of a freezer.

Although the above mentioned method is adapted to a refrigeration system, nevertheless it can be improved as the above prior art method is mainly directed to reduce losses of energy due to ripples. It turns out that still, nevertheless, a refrigeration system demands for an improved kind of power consumption information to be communicated to an aggregator of a smart-grid setup. It turns out that there are some significant drawbacks when scheduling a refrigeration system with power consumption information which handles a maximum power consumption in the sense of nominal values and minimum power consumption values in the sense of zero values.

SUMMARY

It is desirable to enable a power control of a centralized refrigeration system in a smart-grid setup, when an aggregator provides the power reference in response to an improved determined flexibility margin beyond absolute maximum and minimum values of nominal and zero power consumption.

It is an object of embodiments of the invention to provide a method and a power control of improved kind, which address at least one of the above mentioned challenges, in particular such that power consumption information can be communicated to a smart-grid setup, in particular an aggregator thereof, in an improved way, preferably on the basis of an improved modeling of a refrigeration system.

Still further, it is an object of embodiments of the invention in particular to provide an improved communication sequence between the refrigeration system and a smart-grid setup, in particular an aggregator of a smart-grid setup, in a method of operating a power controller.

Still further, it is an object of embodiments of the invention in particular to provide an improved way of determining a power consumption of a cooling entity of the refrigeration system and/or an improved determination of power consumption of the refrigeration system to provide an improved total amount of power consumption information to be communicated to a smart-grid setup, in particular to the aggregator of a smart-grid setup.

The invention provides a method for operating at least one distributed energy resource comprising a refrigeration system with at least one compressor, at least one heat rejecting heat exchanger, and a number of cooling entities, each cooling entity comprising an evaporator and an expansion valve controlling a supply of refrigerant to the evaporator, the method comprising the steps of:

a smart-grid setup requesting power consumption information related to a power consumption of the refrigeration system, from the distributed energy resource, for each of the cooling entities, estimating a power consumption contribution originating from the cooling entity, for each of the cooling entities, determining a state of the cooling entity, and determining whether or not the cooling entity is ready to switch state, calculating at least one parameter being representative for a maximum power consumption, a minimum power consumption, a maximum change in power consumption and/or a minimum change in power consumption of the refrigeration system, based on the estimated power consumption contribution of the cooling entities, and based on the determined states of the cooling entities and whether or not the cooling entities are ready to switch state, transmitting the requested power consumption information, in the form of the calculated parameter(s) to the smart-grid setup, the smart-grid setup transmitting a power reference to the distributed energy resource, the power reference taking the transmitted power consumption information into account, the distributed energy resource controlling the cooling entities in order to obtain a power consumption of the refrigeration system which corresponds to the power reference.

More particularly, the invention provides a method operating at least one distributed energy resource comprising a refrigeration system with at least one compressor, at least one heat rejecting heat exchanger, and two or more cooling entities, each cooling entity comprising an evaporator and an expansion valve controlling a supply of refrigerant to the evaporator, the method comprising the steps of:

a smart-grid setup requesting information regarding expected minimum power consumption and/or expected maximum power consumption of the refrigeration system during a defined future time interval, from the distributed energy resource, for each of the cooling entities, a controller of the distributed energy resource estimating a power consumption contribution originating from the cooling entity, for each of the cooling entities, the controller of the distributed energy resource determining whether the cooling entity is in a state in which the evaporator of the cooling entity receives refrigerant or in a state in which the evaporator of the cooling entity is not receiving refrigerant, and determining whether or not the cooling entity is ready to switch state, the controller of the distributed energy resource calculating an expected minimum power consumption and/or an expected maximum power consumption of the refrigeration system during the defined future time interval, based on the estimated power consumption contributions of the cooling entities, and based on the determined states of the cooling entities and whether or not the cooling entities are ready to switch state, the controller of the distributed energy resource transmitting the calculated expected minimum power consumption and/or expected maximum power consumption of the refrigeration system to the smart-grid setup, the smart-grid setup transmitting a power reference to the distributed energy resource, the power reference being within a power interval defined by the transmitted expected minimum power consumption and/or expected maximum power consumption, and the distributed energy resource controlling the cooling entities using the power reference received from the smart-grid setup as a setpoint value for the power consumption of the refrigeration system, during the defined time interval.

The present invention relates to a method for operating at least one distributed energy resource (DER). In the present context the term 'distributed energy resource' should be interpreted to mean an installation which is connected to a power grid. The distributed energy resource is capable of providing services to the power grid in the form of flexibility in the power consumption or power production of the distributed energy resource. The present invention is in particular directed towards operation of a DER in the form of a power consumer, but it is not ruled out that the DER could be a power producer.

The distributed energy resource is of a kind which comprises a refrigeration system. In the present context the term 'refrigeration system' should be interpreted to mean any system in which a flow of fluid medium, such as refrigerant, circulates and is alternatingly compressed and expanded, thereby providing refrigeration of a volume. The refrigeration system may, e.g., be an air condition system, a supermarket refrigeration system, etc.

The refrigeration system comprises at least one compressor, at least one heat rejecting heat exchanger, e.g. in the form of condensers or gas coolers, and a two or more cooling entities. Each cooling entity comprises an evaporator and an expansion valve controlling a supply of refrigerant to the evaporator. Refrigerant flowing in the refrigeration system is thereby compressed by the compressor(s). The compressed refrigerant is supplied to the heat rejecting heat exchanger(s), where heat exchange takes place between the refrigerant and the ambient, in such a manner that heat is rejected from the refrigerant. The refrigerant is then passed to the expansion valves of the cooling entities, where it is expanded into the respective evaporators. The mass flow of refrigerant to each evaporator is controlled by means of the corresponding expansion valve. Thereby a temperature in a cooling entity can be controlled by controlling the expansion valve of the cooling entity, and thereby the mass flow of refrigerant to the corresponding evaporator.

According to the method of the invention, a smart-grid setup initially requests power consumption information related to a power consumption of the refrigeration system, from the distributed energy resource, in the form of information regarding expected minimum power consumption and/or expected maximum power consumption of the refrigeration system during a defined future time interval. In the present context the term 'smart-grid setup' should be interpreted to mean an arrangement including a power grid having a number of power consumers and a number of power suppliers connected thereto, and which is capable of controlling consumption of power by the power consumers in order to match an available supply of power provided by the power providers.

The requested power consumption information is related to the power consumption of the refrigeration system, i.e. it provides information regarding how much power is consumed by the refrigeration system. This may include a current power consumption level, a previous power consumption level and/or a future expected or possible power consumption level.

In response to the request for power consumption information, a power consumption contribution is estimated for each of the cooling entities, by a controller of the distributed energy resource. Thus, for each of the cooling entities of the refrigeration system it is estimated, how large a part of the total power consumption of the refrigeration system can be assumed to originate from that cooling entity. It should be noted, that the majority of the power consumption in a refrigeration system is used for running the compressors. The power consumption contribution of a given cooling entity is therefore not solely the power consumption involved with the direct control of that cooling entity, such as switching of valves, etc., but also includes the part of the power consumption of the compressors which the cooling entity may be considered as being responsible for.

The controller of the distributed energy resource may be a dedicated controller which is only used for controlling the distributed energy resource, or even only the refrigeration system of the distributed energy resource. As an alternative, the controller of the distributed energy resource may further be used for controlling one or more further distributed energy resources, or one or more further refrigeration systems. For instance, in a supermarket chain, there may be a supervising centre, from where refrigeration systems of several supermarkets are monitored. In this case the controller of the distributed energy resource may be arranged in such a supervising centre, and it may be used for controlling all of the refrigeration systems being monitored.

Furthermore, for each cooling entity, a state of the cooling entity is determined, and it is determined whether or not the cooling entity is ready to switch state. More particularly, the controller of the distributed energy resource determines, for each of the cooling entities, whether the cooling entity is in a state in which the evaporator of the cooling entity receives refrigerant or in a state in which the evaporator of the cooling entity is not receiving refrigerant. Thus, in the present context the term 'state of a cooling entity' should be interpreted to cover whether or not the cooling entity is operating. For instance, the cooling entity may be in an 'on' state in which refrigerant is supplied to the evaporator, and the temperature inside a refrigerated volume arranged in contact with the evaporator is therefore decreasing. Or the cooling entity may be in an 'off' state in which refrigerant is not supplied to the evaporator, and the temperature inside the refrigerated volume is therefore increasing. The cooling entity is ready to switch state if it is appropriate to switch the cooling entity from an 'on' state to an 'off' state or from an 'off' state to an 'on' state, based on appropriate criteria which have previously been defined. The criteria may, e.g., take into account constraints on the operation of the refrigeration system, such as acceptable temperatures of the cooling entities, etc. This will be described in further detail below.

Then at least one parameter is calculated, based on the estimated power consumption contributions of the cooling entities, and based on the determined states of the cooling entities and whether or not the cooling entities are ready to switch state. The calculated parameter(s) is/are representative for a maximum power consumption, a minimum power consumption, a maximum change in power consumption and/or a minimum change in power consumption of the refrigeration system.

More particularly, the controller of the distributed energy resource calculates an expected minimum power consumption and/or an expected maximum power consumption of the refrigeration system during the defined future time interval. The calculation is based on the estimated power consumption contributions of the cooling entities, and on the determined states of the cooling entities and whether or not the cooling entities are ready to switch state.

In the case that (one of) the calculated parameter(s) is representative for a maximum power consumption, this could, e.g., reflect a maximum power consumption which the refrigeration system is capable of providing, such as if all of the cooling entities, which are currently in the 'on' state are kept in the 'on' state, and all of the cooling entities which are currently in the 'off' state and ready to switch state are switched to the 'on' state.

Similarly, in the case that (one of) the calculated parameter(s) is representative for a maximum change in power consumption, this could, e.g., reflect how much the total power consumption of the refrigeration system can be increased from the current power consumption level, in the manner described above.

In the case that (one of) the calculated parameter(s) is representative for a minimum power consumption, this could, e.g., reflect a minimum power consumption which the refrigeration system is capable of providing, such as if all of the cooling entities, which are currently in the 'off' state are kept in the 'off' state, and all of the cooling entities which are currently in the 'on' state and ready to switch state are switched to the 'off' state.

Similarly, in the case that (one of) the calculated parameter(s) is representative for a minimum change in power consumption, this could, e.g., reflect how much the total power consumption of the refrigeration system can be decreased from the current power consumption level, in the manner described above.

It is noted that when a cooling entity is switched from an 'off' state to an 'on' state, the amount of refrigerant being supplied to the compressors is increased, thereby increasing the power consumption of the compressors. Similarly, when a cooling entity is switched from an 'on' state to an 'off' state, the amount of refrigerant being supplied to the compressors is decreased, thereby decreasing the power consumption of the compressors.

In any event, the calculated parameter(s) provide(s) information regarding to which extent the smart-grid setup may expect the refrigeration system to be able to increase and/or decrease its power consumption without adversely affecting the primary operation of the refrigeration system.

Next, the requested power consumption information is transmitted to the smart-grid setup, in the form of the calculated parameter(s). More particularly, the controller of the distributed energy resource transmits the calculated expected minimum power consumption and/or expected maximum power consumption of the refrigeration system to the smart-grid setup. Accordingly, the transmitted power consumption information provides valuable information to the smart-grid setup regarding to which extent it may request the DER to increase and/or increase its power consumption. The smart-grid setup can use this information when planning how to adjust the power consumption of the various power consumers connected to the smart-grid in order to match an available supply of power provided by power suppliers connected to the smart-grid.

When the smart-grid setup has received the requested power consumption information, the smart-grid setup transmits a power reference to the distributed energy resource (DER), the power reference taking the transmitted power consumption into account, in the sense that the power reference is within a power interval defined by the transmitted expected minimum power consumption and/or expected maximum power consumption. Thus, the power reference does not go beyond the power consumption levels which the refrigeration system is capable of providing. However, the power reference also reflects a need of the smart-grid setup to increase or decrease the total power consumption of the power consumers connected to the smart-grid, in order to match the available power production.

Finally, the distributed energy resource (DER) controls the cooling entities in order to obtain a power consumption of the refrigeration system which corresponds to the power reference, i.e. using the power reference received from the smart-grid setup as a setpoint value for the power consumption of the refrigeration system, during the defined time interval. The cooling entities may, e.g., be controlled by the controller of the distributed energy resource (DER) which also performs the steps of estimating power consumption contributions of the cooling entities, determining the states of the cooling entities, etc. As an alternative, the cooling entities may be controlled by means of another controller, e.g. a controller which is dedicated for controlling the cooling entities.

Thereby the total power consumption of the refrigeration system is adjusted to match the need of the smart-grid setup, without compromising the primary operation of the refrigeration system, including constraints in temperatures prevailing in the cooling entities.

In a refrigeration system, the majority of the consumed power is consumed by the compressors. However, the operation of the compressors is dictated by the primary processes of the refrigeration system, i.e. the operation of the cooling entities. Thereby the operation of the compressors is also affected by the constraints which are imposed on the operation of the cooling entities, such as constraints on a prevailing temperature inside refrigerated volumes associated with the cooling entities. It is an advantage of the method of the present invention that the power consumption information provided to the smart-grid setup is generated on the basis of the estimated power consumption contributions of the cooling entities, the states of the cooling entities and whether or not the cooling entities are ready to switch state, because thereby the smart-grid setup obtains reliable information regarding how much 'flexibility' it can expect from the refrigeration system, in terms of adjusting its power consumption, without compromising the primary operation of the refrigeration system. It is also an advantage that the power reference transmitted from the smart-grid setup to the distributed energy resource takes the power consumption information into account, because thereby it is prevented that the smart-grid setup requests the distributed energy resource to provide a power consumption which is in conflict with the primary processes of the refrigeration system. Thus, the smart-grid can rely on that the distributed energy resource will be able to operate at the requested power consumption level, and the primary processes of the refrigeration system are not compromised. This allows the smart-grid setup to efficiently control the total power consumption of the power consumers connected to the smart-grid.

The method may further comprise the step of, for each of the cooling entities, the controller of the distributed energy resource estimating a cooling capacity of the cooling entity, and the step of, for each of the cooling entities, estimating a power consumption contribution originating from the cooling entity may be based on the estimated cooling capacity of the cooling entity. The estimated cooling capacity for a given cooling entity could, e.g., be representative for 'how much cooling' that cooling entity is currently providing, e.g. in the form of heat transfer from refrigerant flowing through the evaporator to a secondary fluid flow across the evaporator. For instance, if a cooling entity is in a state where no refrigerant is supplied to the evaporator, the cooling entity is not providing cooling, and a temperature prevailing in an associated refrigerated volume will be increasing. On the other hand, if the cooling entity is in a state where refrigerant is supplied to the evaporator, the cooling entity is providing cooling, and the temperature inside the associated refrigerated volume is decreasing, possibly at a rate which depends on an opening degree of the expansion valve.

It must be expected that the cooling capacity of a cooling entity is closely related to the amount of refrigerant supplied to the compressors by that cooling entity. Accordingly, the amount of work required by the compressors in order to compress the refrigerant received from that cooling entity must be expected to be dependent on the cooling capacity of the cooling entity. As a consequence, the power consumption contribution originating from a cooling entity must be expected to depend on the cooling capacity of that cooling entity. It is therefore appropriate to estimate the power consumption contribution originating from a given cooling entity on the basis of the estimated cooling capacity of that cooling entity.

Thus, according to this embodiment, a controller keeps track of how much cooling capacity each cooling entity is responsible for, and based thereon, estimates how much power consumption each cooling entity is responsible for.

The step of, for each of the cooling entities, estimating a cooling capacity of the cooling entity may be based on an opening degree of the expansion valve, and on measured values of pressure and temperature of the refrigerant. The mass flow of refrigerant supplied to the evaporator depends on an opening degree of the expansion valve. The heat transfer to refrigerant flowing through the evaporator from a secondary fluid flow across the evaporator depends, amongst other things, on the mass flow of refrigerant through the evaporators, as well as on temperature levels and pressure levels prevailing in the refrigeration system, in particular near the evaporator. For instance, the cooling capacity of a given cooling entity, i, may be calculated using the equations:

$$\dot{m}_i = OD_i \cdot \alpha \cdot \sqrt{2 \cdot \rho_{suc} \cdot (P_c - P_{suc})} \quad (1)$$

$$\dot{Q}_i \dot{m}_i \cdot (h_{oe} - h_{oc}) \quad (2)$$

These equations will be described in further detail below.

The step of, for each of the cooling entities, estimating a power consumption contribution originating from the cooling entity may be based on a coefficient of performance (COP) of the refrigeration cycle of the refrigeration system.

The COP may, e.g., be an estimated value, e.g. based on online measurements and/or on design values of the refrigeration system.

For instance, the power consumption contribution originating from a given cooling entity may be calculated as the estimated cooling capacity of that cooling entity, divided by the COP of the refrigeration cycle.

The step of controlling the cooling entities may comprise controlling the cooling entities on the basis of the estimated power consumption contribution of the cooling entities, and on the basis of the determined states of the cooling entities and whether or not the cooling entities are ready to switch state.

According to this embodiment, the cooling entities may be controlled in the following manner. If the power reference transmitted by the smart-grid setup is higher than the current power consumption level of the refrigeration system, then the total power consumption of refrigeration system must be increased. To this end one or more cooling entities are identified, which are currently in an 'off' state, but which are ready to switch to an 'on' state. Switching one or more of the identified cooling entities from the 'off' state to the 'on' state will result in an increase in the amount of refrigerant being supplied to the compressors, and thereby an increase of the total power consumption of the refrigeration system. Accordingly, a power consumption which matches the higher power reference can be reached.

Similarly, if the power reference transmitted by the smart-grid setup is lower than the current power consumption level of the refrigeration system, then the total power consumption must be decreased. In this case one or more cooling entities are identified, which are currently in an 'on' state, but which are ready to switch to an 'off' state. Similarly to the description above, switching one or more of the identified cooling entities from the 'on' state to the 'off' state will result in a decrease in the total power consumption of the refrigeration system, thereby allowing the lower power reference to be reached.

Accordingly, the step of the distributed energy resource controlling the cooling entities may comprise switching state of one or more of the cooling entities being ready to switch state.

According to one embodiment, the smart-grid setup may comprise an aggregator, and the step of the smart-grid setup requesting power consumption information and/or the step of the smart-grid setup transmitting a power reference may be performed by the aggregator.

In the present context the term 'aggregator' should be interpreted to mean a unit of the smart-grid setup which is dedicated to managing a portfolio of DERs, amongst other things in order to control the power consumption of the managed DER's so that it matches a power consumption needed by the smart-grid setup.

According to this embodiment, the communication between the DER and the smart-grid setup goes via the aggregator. As an alternative, the communication between the DER and the smart-grid setup may take place via other units of the smart-grid setup.

The step of the aggregator requesting power consumption information comprises requesting power consumption information for a requested time slot, i.e. for the defined time interval, and the step of calculating at least one parameter comprises calculating the parameter(s) with respect to the requested time slot.

The smart-grid setup may be in need of adjusting the total power consumption of the power consumers connected to the smart-grid during a specified future time slot. Therefore, when the aggregator requests power consumption information from the DER, it specifically requests information relating to that specific time slot. When calculating the parameter(s) specific conditions related to the specific time slot are taken into account, for instance the time of the day, expected cooling loads, predictions regarding the expected state of each cooling entity, and which and how many cooling entities are expected to be ready to switch state, etc. Furthermore, the length of the time slot may also be taken into account. For instance, only contributions from cooling entities which are ready to switch state, and which will not have to switch back to the original state during the time slot may be taken into account when calculating how much the refrigeration system is capable of adjusting its total power consumption.

Thus, the smart-grid setup obtains information regarding to which extent the DER is capable of adjusting its power consumption during the specified time slot, i.e. the defined time interval, and thereby the smart-grid setup is capable of planning how to obtain a required total power consumption of the power consumers connected to the smart-grid, during the specified time slot.

The step of transmitting the requested power consumption information may comprise transmitting a maximum power consumption, and the power reference transmitted by the smart-grid setup may be below the maximum power consumption. According to this embodiment, the smart-grid setup may be in need of increasing the total power consumption of the power consumers connected to the smart-grid. Therefore the aggregator requests a maximum power consumption from the DER in order to find out how large an increase in power consumption it can expect the DER to deliver. The smart-grid setup then ensures that the power reference which is subsequently transmitted to the DER does not exceed the maximum power consumption, since operating the refrigeration system in order to provide a power consumption which exceeds the calculated maximum power consumption would compromise the primary operation of the refrigeration system. Therefore, if the aggregator would request the DER to increase its power consumption to a level above the maximum power consumption, then the DER would simply not comply, because the primary operation of the refrigeration system takes precedence over fulfilling requirements defined by the smart-grid. As a consequence, the smart-grid would not fulfil its goal of reaching a desired total power consumption of the power consumers connected to the smart-grid.

Alternatively or additionally, the step of transmitting the requested power consumption information may comprise transmitting a minimum power consumption, and the power reference transmitted by the smart-grid setup may be above the minimum power consumption. According to this embodiment, the smart-grid setup may be in need of decreasing the total power consumption of the power consumers connected to the smart-grid. Therefore the aggregator requests a minimum power consumption from the DER in order to find out how large a decrease in power consumption it can expect the DER to deliver. Similarly to the situation described above, the smart-grid setup ensures that the power reference is not below the minimum power consumption, in order to allow the DER to deliver a power consumption corresponding to the requested power reference, without compromising the primary operation of the refrigeration system.

The step of, for each of the cooling entities, the controller of the distributed energy resource determining whether the cooling entity is in a state in which the evaporator of the cooling entity receives refrigerant or in a state in which the evaporator of the cooling entity is not receiving refrigerant, and determining whether or not the cooling entity is ready to switch state may comprise the steps of, for each of the cooling entities:

determining whether the cooling entity is in an on state, in which refrigerant is supplied to the evaporator, or in an off state, in which no refrigerant is supplied to the evaporator,
  obtaining a temperature inside a refrigerated volume being cooled by means of the evaporator of the cooling entity,
  in the case that the cooling entity is in an on state, comparing the obtained temperature to a cut-out temperature of the cooling entity, and determining that the cooling entity is ready to switch state if the difference between the obtained temperature and the cut-out temperature is below a first threshold value, and
  in the case that the cooling entity is in an off state, comparing the obtained temperature to a cut-in temperature of the cooling entity, and determining that the cooling entity is ready to switch state if the difference between the obtained temperature and the cut-in temperature is below a second threshold value.

During normal operation of a cooling entity of a refrigeration system, the supply of refrigerant to the evaporator is controlled in order to obtain a temperature inside the refrigerated volume which is within a specified temperature band. In order to obtain this, the expansion valve is opened when the temperature inside the refrigerated volume reaches a cut-in temperature. This will result in the cooling entity being switched from the off state to the on state, refrigerant being supplied to the evaporator, and the temperature inside the refrigerated volume will start to decrease. It should be noted that, in the present context, an 'on' state of the expansion valve may be obtained by opening and closing the valve during a given time period, thereby obtaining an effective opening degree of the valve, which depends on the open/closed times of the valve during the given time period. This manner of operating an expansion valve is often referred to as pulse width modulation. When the temperature inside the refrigerated volume reaches a cut-out temperature, the expansion valve is closed, thereby switching the cooling entity to the off state. As a consequence, the temperature will start increasing again, until the cut-in temperature is reached, etc.

According to this embodiment of the invention, the following process is performed for each of the cooling entities of the refrigeration system.

Initially, it is determined whether the cooling entity is in an on state or in an off state. The cooling entity is in an on state if refrigerant is supplied to the evaporator, via the expansion valve. In this case the temperature inside a refrigerated volume being cooled by means of the evaporator of the cooling entity is decreasing, due to the heat exchange taking place between the refrigerant flowing through the evaporator and air inside the refrigerated volume. The cooling entity is in an off state if no refrigerant is supplied to the evaporator, i.e. if the expansion valve is closed. In this case no heat exchange takes place between refrigerant in the evaporator and the air inside the refrigerated volume, and therefore the temperature inside the refrigerated volume is increasing. It should be noted that, in the present context, the term 'refrigerated volume being cooled by means of the evaporator of a cooling entity' should be interpreted to cover a volume which is arranged in thermal contact with the evaporator of the cooling entity, regardless of whether this evaporator receives refrigerant or not.

Furthermore, the temperature inside the refrigerated volume is obtained, e.g. by measuring the temperature.

In the case that it is determined that the cooling entity is in an on state, the obtained temperature is compared to the cut-out temperature, in order to determine how close the temperature inside the refrigerated volume is to the cut-out temperature. If the temperature is close to the cut-out temperature, then the cooling entity will be switched to the off state shortly anyway, and it may therefore make sense to switch the cooling entity to the off state now. On the other hand, if the temperature inside the refrigerated volume is far from the cut-out temperature, then it must be expected that it will take some time before the temperature reaches the cut-out temperature, where the cooling entity will naturally be switched to the off state. For instance, the cooling entity may recently have been switched from the off state to the on state. Furthermore, if the cooling entity is, in this situation, switched from the on state to the off state, it must be expected that the cut-in temperature is reached quickly, thereby causing the cooling entity to be switched back to the on state. Therefore it is not desirable to switch such cooling entities to the off state. Accordingly, it is determined that the cooling entity is ready to switch state if the difference between the obtained temperature and the cut-out temperature is below a first threshold value.

In the case that it is determined that the cooling entity is in an off state, the obtained temperature is compared to the cut-in temperature, in order to determine how close the temperature inside the refrigerated volume is to the cut-in temperature. Similarly to the situation described above, it is appropriate to switch the cooling entity to the on state if the temperature inside the refrigerated volume is close to the cut-in temperature, and it is not appropriate to switch the cooling entity to the on state if the temperature is far from the cut-in temperature. Accordingly, it is determined that the cooling entity is ready to switch state if the difference between the obtained temperature and the cut-in temperature is below a second threshold value.

It should be noted that the first and second threshold values could be in the form of absolute temperature values, or in the form of a percentage of the cut-in and cut-out temperature or the difference between the cut-in and cut-out temperatures.

The first threshold value and/or the second threshold value may be selected in accordance with a length of the defined future time interval. For instance, if the defined future time interval is long, the threshold values may be low in order to ensure that, in the case that the state of the cooling entity is switched in order to adjust the power consumption of the refrigeration system, then it will not be necessary to switch the state of the cooling entity again during the time interval. On the other hand, if the time interval is short, then the risk of cooling entity having to switch state again during the time interval is very low, and therefore higher threshold values may be allowed.

According to one embodiment, the invention starts from a method of operating at least one distributed energy resource comprising a refrigeration system with a number of cooling entities, wherein
a power consumption information is communicated to a smart-grid setup. According to this embodiment the method comprises the steps of:
  requesting a power consumption information from the refrigeration system;

transmitting the power consumption information from the refrigeration system, wherein a total amount of power consumption of the refrigeration system is provided;

wherein:

a cooling capacity of at least one cooling entity is determined wherein an entity operation condition of the cooling entity is taken into account;

a power consumption of at least one cooling entity is determined from the cooling capacity wherein a performance estimation of a refrigeration cycle for the cooling entity is taken into account;

providing the total amount of power consumption as a sum of power consumptions of at least the one cooling entity of the number of cooling entities, in particular as a sum of relevant power consumptions of the number of cooling entities, receiving at the refrigeration system a power reference from the smart-grid setup.

Thus, according to this embodiment of the invention a total amount of power consumption of the refrigeration system is based on an estimation of a total amount of power consumption, in that:

a cooling capacity of at least one cooling entity is determined wherein an entity operation condition of the cooling entity is taken into account;

a power consumption of at least one cooling entity is determined from the cooling capacity wherein a performance estimation of a refrigeration cycle for the cooling entity is taken into account; and the total amount of power consumption is provided as a sum of power consumptions of at least the one cooling entity of the number of cooling entities, in particular as a sum of relevant power consumptions of the number of cooling entities.

A power control unit is adapted for communicating a power consumption information to a smart-grid setup, in particular to be communicatively connected to an aggregator of a smart-grid setup, in particular to execute the method steps of a method according to an embodiment of the invention. According to the invention the unit may comprise:

an input channel for receiving a request of a power consumption information from the refrigeration system, in particular an input channel to the aggregator;

an output channel for transmitting the power consumption information from the refrigeration system, wherein a total amount of power consumption of the refrigeration system is provided, in particular an output channel to the aggregator;

wherein:

a first module for determining a cooling capacity of at least one cooling entity and taking into account an entity operation condition of the cooling entity;

a second module for determining a power consumption of at least one cooling entity from the cooling capacity and taking into account a performance estimation of a refrigeration cycle for the cooling entity;

a third module for providing the total amount of power consumption as a sum of power consumptions of at least the one cooling entity of the number of cooling entities, in particular as a sum of relevant power consumptions of the number of cooling entities, an input channel for receiving at the refrigeration system a power reference from the smart-grid setup.

A further power control unit may be adapted for operating at least one distributed energy resource comprising a refrigeration system with a number of cooling entities, in particular to execute the method steps of a method according to an embodiment of the invention. According to the invention the unit may further comprise:

an operation information base providing an entity operation condition of the cooling entity a performance information base providing a performance estimation of a refrigeration cycle for the cooling entity; and optionally a relevance information base providing a relevance status for each of the cooling entities, and optionally a timer.

The invention also leads to a system of a power control unit implemented in an entity selected from the group of entities comprising:

an aggregator, a distributed energy resource controller, adapted for operating at least one distributed energy resource comprising a refrigeration system with a number of cooling entities, a distributed energy resource comprising a refrigeration system with a number of cooling entities, a power controller interface between the aggregator and the distributed energy resource controller.

The invention also leads to a smart-grid setup comprising an electrical grid operator and an aggregator for connection to a market place assigned to the electrical grid, wherein the aggregator and a number of distributed energy resources are communicatively connected via a power controller unit.

The invention starts from the consideration in that generally some DERs will have a state dependent minimum and maximum power consumption due to fact the DER is serving some primary process that imposes constraints. Hence, the DER will not be able consume zero power or nominal power for any given time period at any given point in time. When the supermarket refrigeration system is used as a DER it becomes an example of a DER unit with state dependent minimum and maximum power consumption, and it will therefore be required by the aggregator that the supermarket refrigeration system is able to estimate its minimum and maximum power consumption for a given time period.

Thus the invention recognizes that an estimate of the maximum and minimum power consumption of the refrigeration system, in particular for a given time period, is preferable. Therein, further according to the invention for providing a total amount of power consumption of the refrigeration system:

a cooling capacity of at least one cooling entity is determined wherein an entity operation condition of the cooling entity is taken into account;

a power consumption of at least one cooling entity is determined from the cooling capacity wherein a performance estimation of a refrigeration cycle for the cooling entity is taken into account, and then providing the total amount of power consumption as a sum of power consumptions of at least the one cooling entity of the number of cooling entities, in particular as a sum of relevant power consumptions of the number of cooling entities.

The invention recognizes that it is not self-understanding to estimate reliably a possible flexible margin for the power consumption, in particular within a given time frame, as the load devices of the refrigeration system itself, complex enough, in general do not provide such information.

The invention has realized that this information can be provided by the controllers of the various refrigerating entities (in particular by duct controllers like compressor, valves, evaporator and/or condenser and the respective valves) which can be characterized by said entity operation condition and then be converted to information about estimated power consumption in terms of said performance estimation, in particular by using the coefficient of performance, COP. Said performance estimation states, in particular by using the COP, how efficient the refrigeration cycle is.

Thus, the method presented enables power control of a centralized refrigeration system in a smart-grid setup where an aggregator provides the power reference. In addition, the method also enables the refrigeration system to improve determining flexibility margins beyond absolute max./min values of nominal and zero.

These and further developed configurations of the invention are further outlined in the dependent claims. Thereby, the mentioned advantages of the proposed concept are even more improved. For each feature of the dependent claims it is claimed independent protection independent from all other features of this disclosure. In particular, in the following already abbreviations of terms and reference signs are used in parenthesis to support understanding, which however is not meant to be restricting to the subject matter claimed.

Communicating to the smart-grid setup via a power controller unit (PCU) is possible via various entities thereof in principle as the smart-grid setup usually comprises an electrical grid operator (EGO) and a market place (MP) assigned to the electrical grid. Preferably the smart-grid setup further comprises an aggregator (A) for connection to a number of distributed energy resources (DER) which are in communicatively connected via a power controller unit (PCU) according to the inventive concept. Thus, an aggregator is a preferred tool to handle a portfolio with number of distributed energy resources (DER). In a preferred embodiment the power consumption information and/or transmitting (S1) the power consumption information and/or receiving (S2) a power reference ($W_{ref}$) at the refrigeration system (1) is performed via the aggregator (A) of the smart-grid setup (SG).

Preferably the power reference ($W_{ref}$) is adapted to the power flexibility margin such that the power reference ($W_{ref}$) fits into the power flexibility margin. This provision supports that the power reference ($W_{ref}$) indeed can be served within the power flexibility margin. In particular it is preferred that the power reference ($W_{ref}$) is adapted to the power flexibility margin in that it is requested said total amount of power consumption margin ($P_{min}$, $P_{max}$) of the refrigeration system (1).

In particular the power reference ($W_{ref}$) is adapted to the power flexibility margin in that the power consumption information is requested (S0) for a requested time (t) to the refrigeration system (1) and (S1) the provided total amount of power consumption ($P_{min}$, $P_{max}$) of the refrigeration system (1) is for a providing-time ($t_{min}$, $t_{max}$) of a total amount of power consumption margin ($P_{min}$, $P_{max}$), wherein the providing-time ($t_{min}$, $t_{max}$) is the same as the requested time (t).

In particular the power reference ($W_{ref}$) is adapted to a power flexibility margin in that the power consumption information is requested (S0) for a requested time (t) from the refrigeration system (1), and (S1) the provided total amount of power consumption ($P_{min}$, $P_{max}$) of the refrigeration system (1) is for a providing-time ($t_{min}$, $t_{max}$) of a total amount of power consumption ($P_{min}$, $P_{max}$), wherein the providing-time ($t_{min}$, $t_{max}$) is the same as the requested time (t).

In a preferred embodiment the power flexibility margin comprising said total amount of power consumption margin ($P_{min}$, $P_{max}$) of the refrigeration system (1) is the total amount of power consumption margin ($P_{min}$, $P_{max}$) of the compressors of the refrigeration system (1) mainly. This embodiment recognizes that power consumption in a first approach can be estimated to be ruled by the power consumption of the compressors of a refrigeration system, whilst other power consumptions like e.g. power consumptions of valves etc. can be neglected for the purposes of the invention.

In the preferred embodiment the challenge is in particular that the compressors are the substantial energy consumers in a refrigeration system whereas the energy consumed by the electronic expansion valves is rather small. Thus, the preferred approach of the embodiment is in that the estimation provides how much power the compressors will consume within the given time frame. This is not trivial as the compressors by themselves do not provide any information about what can be done to reduce or increase the energy consumption.

In the preferred embodiment this information can be provided by the controllers of the various refrigerating entities and then be converted to information about estimated power consumption in terms of said performance estimation, in particular by using the COP. Said performance estimation states, in particular by using the COP, how efficient the refrigeration cycle is. How much power does the compressor consume in order to move a certain energy amount per time from the interior of the refrigerating entity to the surroundings.

In particular the total amount of power consumption of the refrigeration system (1) for the requested time is provided as an upper total amount of power consumption ($P_{max}$), in particular as an upper total amount of power consumption ($P_{max}$) for an upper activation time ($t_{max}$).

In particular the total amount of power consumption of the refrigeration system (1) for the requested time is provided as a lower total amount of power consumption ($P_{min}$), in particular as a lower total amount of power consumption ($P_{min}$) for a lower activation time ($t_{min}$).

In particular the power reference ($W_{ref}$) is adapted to the power flexibility margin such that:
the power reference ($W_{ref}$) is below an upper total amount of power consumption ($P_{max}$) and/or above a lower total amount of power consumption ($P_{min}$),
in particular the power reference ($W_{ref}$) is below an upper total amount of power consumption ($P_{max}$) and above a measured power consumption ($P_{meas}$) for the refrigeration system (1) or above a lower total amount of power consumption ($P_{min}$) and below a measured power consumption ($P_{meas}$) for the refrigeration system (1).

In particular the total amount of power consumption of the refrigeration system (1) for the requested time is provided as a flexible margin of an upper total amount of upper power consumption ($P_{max}$) and as a lower total amount of lower power consumption ($P_{min}$). It should be noted that, although the labeling of the upper and lower limitation of the flexible margin herein is labeled as $P_{max}$ and $P_{min}$ still nevertheless this will not be a maximum or nominal value of power consumption or zero or near-zero power consumption of a switched-off cooling entity. $P_{max}$ and $P_{min}$ denote herein an upper or lower value of power consumption as a result of the estimation process and thus can be considered as a changing result of sampling the cooling entities.

In particular a lower total amount of power consumption ($P_{min}$) of the refrigeration system (1), in particular for a lower activation time ($t_{min}$), is provided as a measured power consumption ($P_{meas}$) for the refrigeration system (1) decreased by an estimated, in particular accumulated, lower change ($\Delta P_{min}$) in power consumption.

In particular an upper total amount of power consumption ($P_{max}$) of the refrigeration system (1), in particular for an upper activation time ($t_{max}$), is provided as a measured power consumption ($P_{meas}$) for the refrigeration system (1) increased by an estimated, in particular accumulated, upper change ($\Delta P_{max}$) in power consumption.

Preferably in an embodiment the entity operation condition (CE) is addressed properly. In a preferred development the cooling capacity (Q) is provided by monitoring each of the cooling entities.

Preferably therein:
a mass flow rate (dm/dt) of gas at the inlet side of the cooling entity is determined, in particular is determined via monitoring the mass flow rate of each of the cooling entities on the suction side of a compressor, and
a cooling enthalpy ($\Delta h = h_{oe} - h_{oc}$) over the cooling entity is determined, in particular is determined via monitoring the cooling enthalpy over each of the cooling entities between a condenser and evaporator.

Preferably the mass flow rate (dm/dt) is determined at least on basis of
an opening degree ($OD_i$) of an inlet valve at the inlet side of the cooling entity ($E_1$, $E_2$) and/or
a pressure drop ($\Delta P = P_c - P_{suc}$) between a pressure side pressure ($P_c$) of a compressor of the cooling entity ($E_1$, $E_2$) and a suction side pressure ($P_{suc}$) of the compressor, in particular a pressure drop ($\Delta P = P_c - P_{suc}$) from a condenser pressure ($P_s$) to a suction side compressor pressure ($P_{suc}$).

As an example for said entity operation condition Equ. (1) and Equ. (2) as outlined with the description of the drawings allows to calculate the energy per time removed from the refrigerating entity; i.e. by summation of the relevant entities is needed to get the total consumed power, e.g. as expressed by the pseudo-code shown in FIG. 7.

As outlined above in a particular preferred embodiment the method takes into account (D2) a performance estimation (COP) of a refrigeration cycle for the cooling entity ($E_1$, $E_2$) as a functional relationship between the cooling capacity ($dQ/dt_i$) and the power consumption ($W_i$).

As a preferred and easy to handle the functional relationship between the cooling capacity (Q) and the power consumption (W) is given by a proportional relationship and wherein the performance estimation (COP) of the refrigeration cycle is collected by a coefficient of performance of the refrigeration cycle and/or the cooling entity. E.g. that the performance estimation (COP) mainly addresses the relation of a cooling capacity (Q) relative to a compressor power consumption and/or the setting of the cooling entity.

As an example of said performance estimation Equ. (3) as outlined with the description of the drawings allows to convert this power into the power that the compressor consumes. The information needed to do the calculations linked to Equ. (1) and Equ. (2) are preferably available in the controllers of the refrigerating entities. The information needed for Equ. (3) preferably can be found in the controller that conducts the estimation of $P_{min}$ and $P_{max}$.

In a further particular preferred development the operating status of a cooling entity of the number of cooling entities is taken into account for the purpose of summing up only the relevant power consumptions.

Preferably the total amount of power consumption ($P_{min}$, $P_{max}$) is provided as a sum of only those power consumptions ($W_i$), which are relevant of at least the one cooling entity of the number of cooling entities ($E_1$, $E_2$), wherein the sum is performed by sampling the cooling entities and processing a relevance status for each of the cooling entities with regard to a temperature loop of a cooling entity.

Preferably a ready-to-switch criterium of a thermostat of the cooling entity is verified in that a thermostat state can be switched already on before a temperature of a cooling entity reaches a temperature constraint.

Preferably therein it is assumed that
a thermostat state can be switched when the temperature of a cooling entity reaches an upper threshold below a cut-in temperature constraint when an upper total amount of power consumption ($P_{max}$) of the refrigeration system (1) is to be increased, and/or
a thermostat state can be switched when the temperature of a cooling entity reaches a lower threshold above a cut-out temperature constraint when a lower total amount of power consumption ($P_{min}$) of the refrigeration system (1) is to be decreased.

A particular preferred exemplifying embodiment is outlined with the description of FIG. 5 and the pseudo-code shown in FIG. 7.

In a particular preferred example a condition of relevance is provided in that a warmup-time in the temperature loop exceeds a lower activation time ($t_{min}$).

In this case, in particular only in that case, a lower total amount of power consumption ($P_{min}$) is estimated as a measured power consumption ($P_{meas}$) for the refrigeration system (1) decreased by an estimated minimum change ($\Delta P_{min}$) in power consumption, in particular by an accumulated estimated minimum change ($\Delta P_{min}$) in power consumption.

Additionally or alternatively in a particular preferred example a condition of relevance is provided in that a cooldown-time in the temperature loop exceeds an upper activation time ($t_{max}$).

In this case, in particular only in that case, a cooldown-time in the temperature loop exceeds an upper activation time $t_{max}$, an upper amount of power consumption is relevant for estimation.

In this case, in particular only in that case, an upper total amount of power consumption ($P_{max}$) is estimated as a measured power consumption ($P_{meas}$) for the refrigeration system (1) increased by an estimated maximum change ($\Delta P_{max}$) in power consumption, in particular by an accumulated estimated maximum change ($\Delta P_{max}$) in power consumption.

A particular preferred exemplifying embodiment is outlined with the description of FIG. 4 and the pseudo-code shown in FIG. 7.

Preferably in a control loop a desired change in power consumption ($\Delta W$) is determined as a difference between the power reference ($W_{ref}$) for the requested time and an actual measured power consumption ($P_{meas}$) for a cooling entity of the refrigeration system and a state of one or more of the cooling entities of the refrigeration system (1) is toggled by change of an inlet valve, based on a combination of an estimated amount of power consumption ($W_i$) and a desired change in power consumption ($\Delta W$).

The description of the drawing is written with focus on a preferred application of the concept of the invention to a DER comprising a supermarket refrigeration system SRS; however the method could be described in more broader terms to cover other refrigeration systems and also other types of energy systems ES as shown in FIG. 1.

For a more complete understanding of the invention, the invention will now be described in detail with reference to the accompanying drawing. The detailed description will illustrate and describe what is considered as preferred embodiments of the invention. It should of course be understood that various modifications and changes in form or detail could readily be made without departing from the spirit of the invention. It is therefore intended that the invention may not be limited to the exact form and detail shown and described herein, nor to anything less than the whole of the invention disclosed herein and as claimed hereinafter. Further the features described in the description, the drawing and the claims disclosing the invention may be essential for the invention considered alone or in combination. In particular, any reference signs in the claims shall not be construed as limiting the scope of the invention. The wording "comprising" does not exclude other elements or steps. The wording "a" or "an" does NOT exclude a plurality. The wording, "a number of" items, comprises also the number one, i.e. a single item, and further numbers like two, three, four and so forth.

BRIEF DESCRIPTION OF THE DRAWINGS

The drawing shows in:

FIG. 1 shows a general scheme of a smart-grid setup with generally relevant entities and information flow there between;

DETAILED DESCRIPTION

Figure 1:
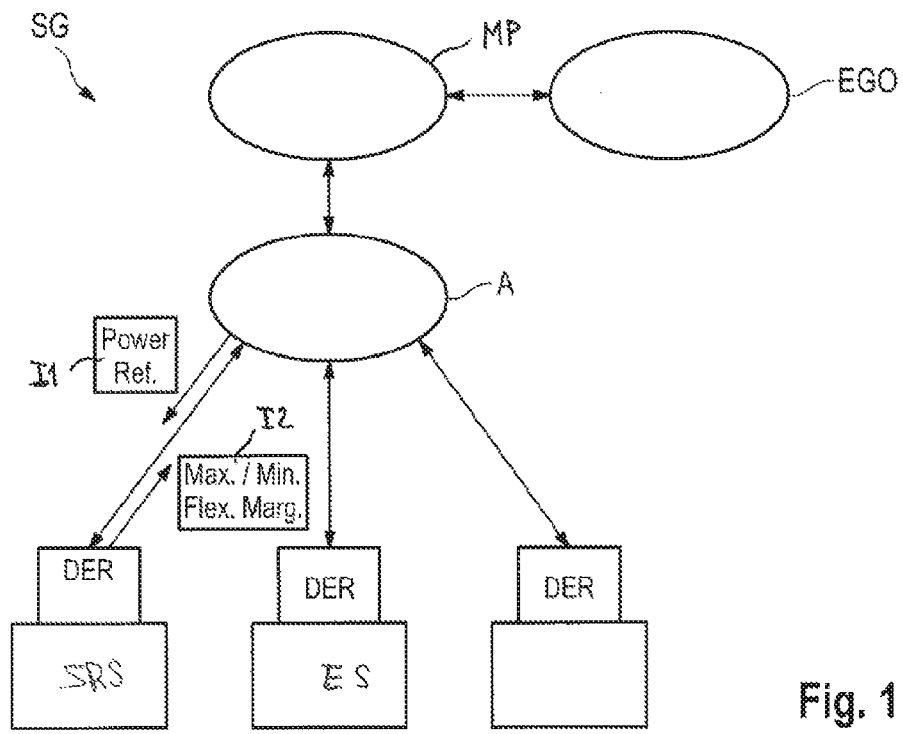

An exemplifying prior art smart-grid setup SG is depicted in FIG. 1 wherein an electrical grid operator EGO tries to purchase various regulation services from a market place MP, to enable the EGO to deal with physical constraints on the electrical grid. An aggregator A is able to manage a portfolio of distributed energy resources DER. In this example most of the DER's comprise a supermarket refrigeration system SRS or even consist of one or more supermarket refrigeration systems. However the method is in more broader terms also directed to cover other refrigeration systems and thus the DER may provide any kind of other types of cooling, heating or ventilation energy systems ES; also in FIG. 1 a DER is depicted as part of the portfolio which has no specified purpose and thus serves as a placeholder of any other kind of energy system providing load and energy resources of a DER.

As shown further in FIG. 1 the bidirectional arrow between the aggregator A and the DER's represent the information flow required for the aggregator A to be able to control the DER. The requirement for the communication between the aggregator A and the DER will depend on the particular setup, but will almost always include a power reference 11 being sent from the aggregator to the DER and the DER sending the aggregator estimates 12 of the flexibility of the particular unit. Hence, a given DER will have to be able to do power control and provide flexibility estimates. The flexibility of a unit however in the prior art is partly described by the maximum and minimum power consumption maintained for a given time period. Hence, the DER is usually required to provide estimates of maximum and minimum power consumption for a given time period. Estimates of the minimum and maximum power consumption will be trivial for many applications because they will be state-independent. This means in a trivial application an ON-state or OFF-state of the application can be defined and thus a power consumption may depend only on an ON-state or OFF-state of the application; therefore in a trivial application a power consumption can be in a first approach defined as zero for the OFF-state and as a nominal power consumption for the ON-state respectively.

Figure 2:
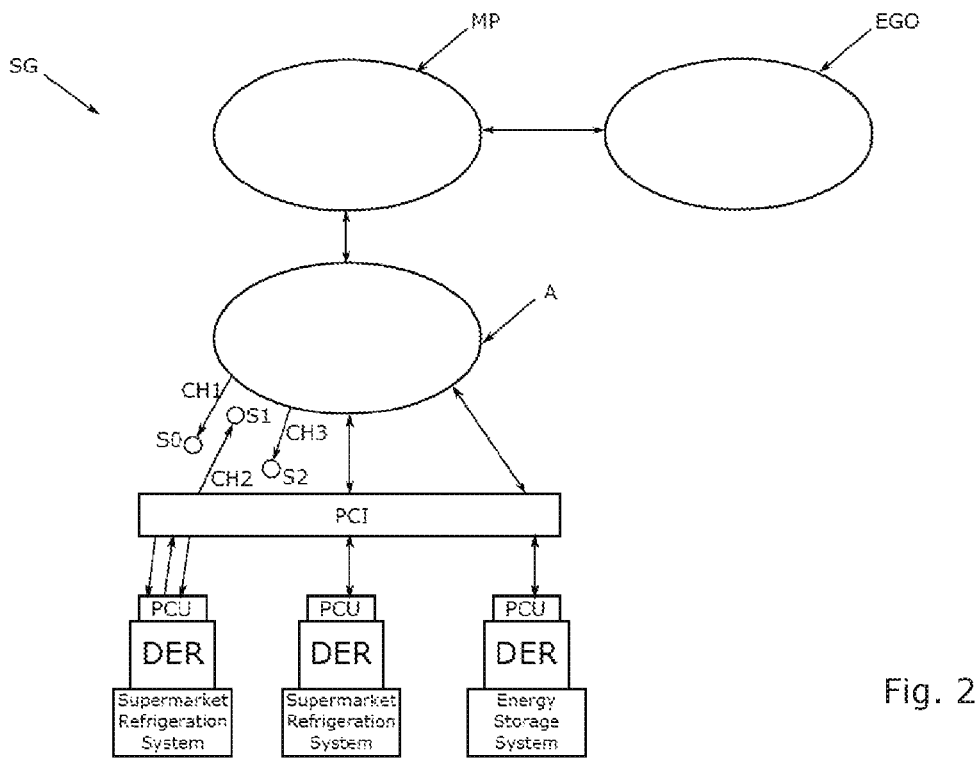
FIG. 2 is a schematic of a smart-grid setup of a preferred embodiment with relevant entities and information flow there between, wherein according to the embodiment a power controller module is provided to be communicatively connected to an aggregator or distributed energy resource controller or interface unit between aggregator and distributed energy resource controller, said power controller module is adapted for estimating a maximum and minimum power consumption of a distributed energy resource comprising a refrigeration system, wherein the maximum and minimum power consumption are estimated for a given time period.

FIG. 2 shows a smart-grid setup SG according to an embodiment of the invention. Each DER comprises a power control unit (PCU) arranged to control the DER during normal operation. Furthermore, for a given DER, the PCU performs at least some of the method steps of the method according to the invention. In particular, the PCU is arranged to estimate the cooling capacity and the power consumption contribution of each of the cooling entities. Furthermore, the PCU is arranged to calculate the parameter(s) being representative for a maximum power consumption, a minimum power consumption, a maximum change in power consumption and/or a minimum change in power consumption of the refrigeration system, and to transmit the calculated parameter(s) to the smart-grid setup. Additionally or in an alternative—decentralized or centralized—a power control unit PCU can also be implemented in an aggregator and/or in a power controller interface (PCI) arranged between an aggregator and the DERs.

Thus, the PCU of each DER at least partly performs the method of the invention, thereby addressing the problem that some DERs will have a state dependent minimum and maximum power consumption due to fact the DER is serving some primary process that imposes constraints. Hence, the DER will not be able consume zero power or nominal power for any given time period at any given point in time. A supermarket refrigeration system is an example of a DER unit with state dependent minimum and maximum power consumption, and it will therefore be required by the aggregator that the supermarket refrigeration system is able to estimate its minimum and maximum power consumption for a given time period.

Figure 6A:
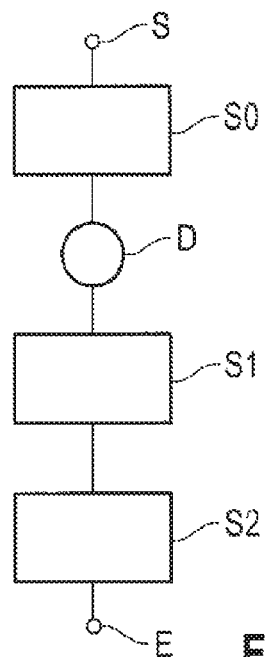
FIG. 6 is a flow chart of the method according to a preferred embodiment, wherein (A) depicts the communication steps of the method and (B) depicts the steps for providing a total amount of power consumption ($P_{min}$, $P_{max}$)

As shown in FIG. 2 and FIG. 6(A) the PCI to be communicatively connected to an aggregator (A) of a smart grid setup (SG) the PCI comprises:
- an input channel CH1 for receiving a request S0 of a power consumption information to the refrigeration system;
- an output channel CH2 for transmitting S1 the power consumption information from the refrigeration system 1, wherein a power flexibility margin is provided with a total amount of power consumption $P_{min}$, $P_{max}$ of the refrigeration system 1
- an input channel CH3 for receiving S2 at the refrigeration system 1 a power reference $W_{ref}$ from the smart grid setup SG.

Thus, the method of the concept deals with power control of such a distributed refrigeration system 1, for example a supermarket refrigeration system, for a smart-grid SG or demand response setup, where an aggregator A is utilizing the refrigeration system as a DER to deliver certain regulation services for the electrical grid as has been described with FIG. 2. A distributed refrigeration system is comprised of at least one compressor rack containing one or more compressors, a heat exchanger to reject the heat to the surroundings, also referred to as a condenser unit, and one or more cooling entities, which are also denoted as display cases.

Figure 3:
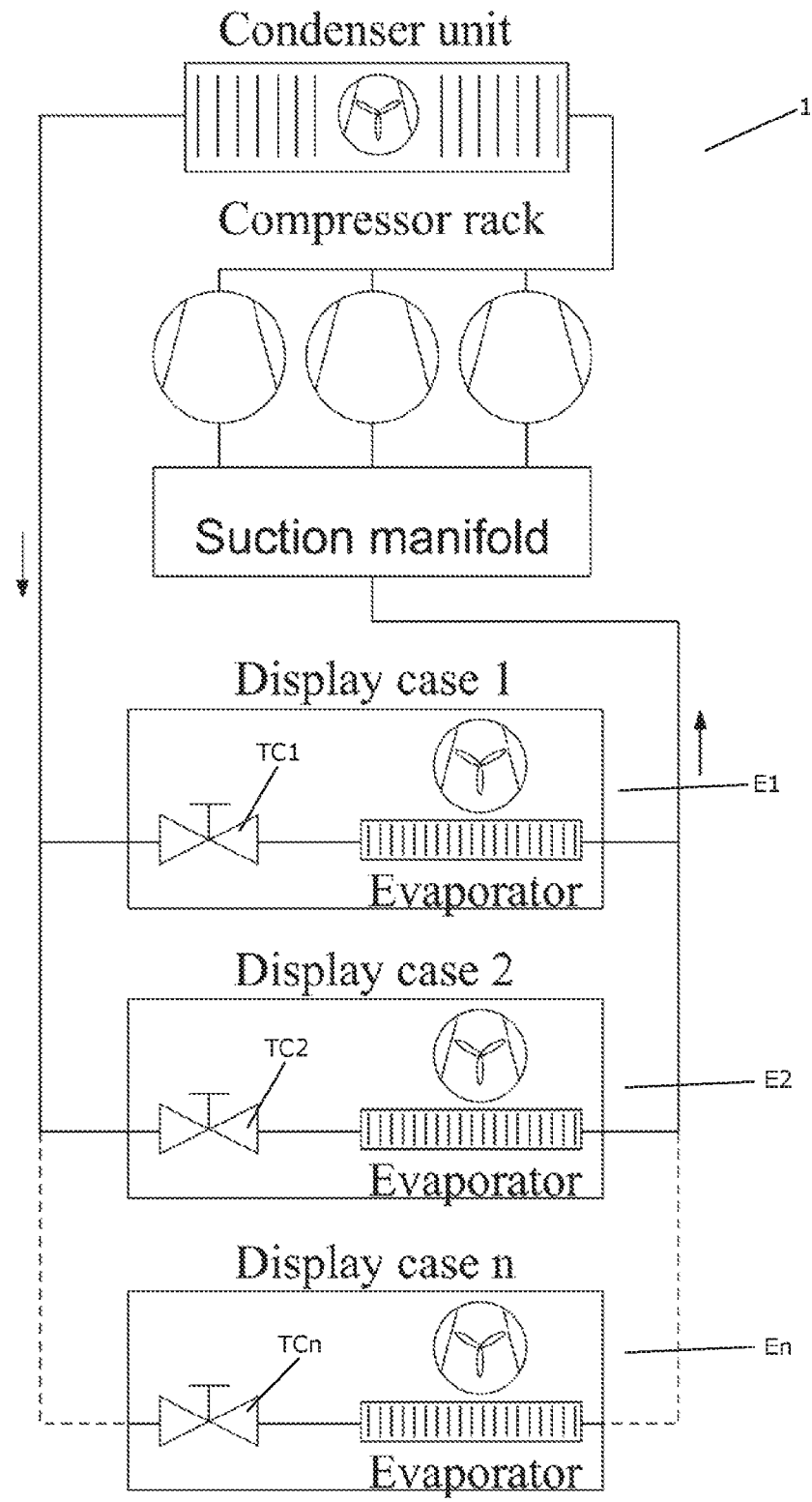
FIG. 3 is a model of a DER (distributed energy resource) comprising a RS (refrigeration system)—in the present embodiment in particular a supermarket RS—and being communicating connected to a power control interface according to an embodiment of the invention said Power controller module is adapted for estimating a maximum and minimum power consumption of a distributed energy resource comprising a refrigeration system, wherein the maximum and minimum power consumption are estimated for a given time period.

FIG. 3 shows in detail a refrigeration system 1 with a number of cooling entities E1, E2, . . . , En, in the form of display cases. Each cooling entity E1, E2, . . . , En comprises an expansion and/or control valve, herein denoted as valves TC1, TC2, . . . , TCn, basically for controlling the evaporation of refrigerant in each evaporator. The evaporator is connected to a suction manifold, which is further connected to a compressor rack, comprising a number of compressors, three of which are shown, operating in parallel. The compressors of the compressor rack are connected to a condenser unit. The cooling entities E1, E2, . . . , En, —each or in common—can be modeled. A coefficient of performance COP is assigned to the refrigeration system for providing a performance estimation, and entity parameters are assigned for providing an entity operation condition CE1, CE2, as will be described in detail with FIG. 7.

The temperature within each of the cooling entities is controlled individually by a local controller which is controlling the temperature TC1, TC2, . . . , TCn, by manipulating the inlet valve to the evaporator like a simple thermostat, which controller may also be implemented in the PCU, partly or as a whole.

Figure 4:
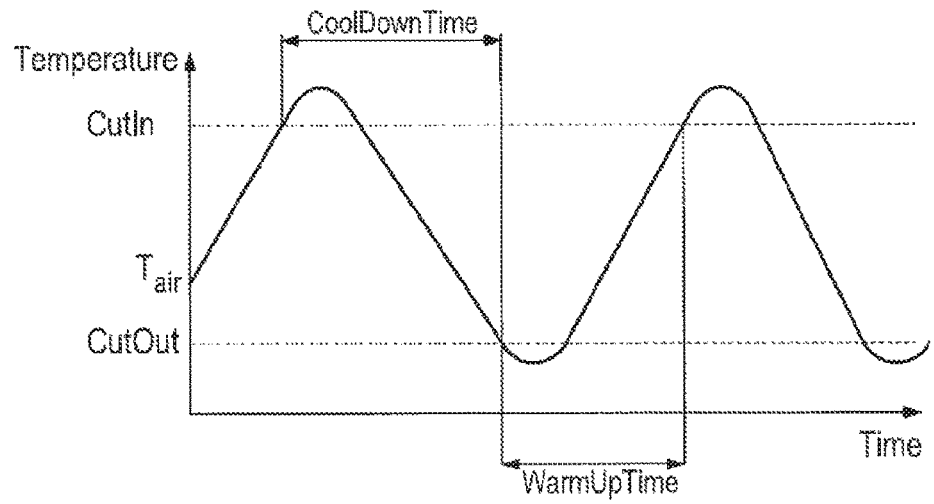
FIG. 4 is a plot of an air temperature in a cooling entity like a display case of FIG. 3, the plot including indication of the upper and lower temperature constraints, the warm up time, and the cool down time according to a preferred embodiment.

The plot in FIG. 4 shows how the cooling entities are controlled and how the air temperature T typically evolves over time t, during normal operation of a cooling entity. Furthermore, the upper temperature (CutIn) and lower temperature (CutOut) constraints can also be seen on the plot along with the warm up time and cool down time. That is—as shown in FIG. 4—if the temperature is above a certain temperature level (CutIn), an inlet valve is opened and refrigerant will flow into the evaporator and evaporate and thereby decrease the temperature of the refrigerated entity. When the temperature reaches a lower temperature constraint (CutOut) the valve will close and the temperature will start to increase within the refrigerated entity.

The compressor racks are typically controlled to deliver a predefined pressure PC1, PC2 on the low pressure side of the compressor rack. To enable a distributed refrigeration system like the one depicted on FIG. 2 to participate in a smart-grid or demand response setup an ability to control the power consumption of the system is established, e.g. by means of the PCUs shown in FIG. 2. The task of the aggregator A, which is optimizing the operation of a portfolio of DERs, will require feedback from the refrigeration system 1 that describes the flexibility of the refrigeration system as has been described with FIG. 2.

One way of describing the flexibility of a DER is by using the minimum and maximum power consumption that the system can maintain for a given time period. For a distributed refrigeration system—as has been recognized by the invention—generally a minimum and maximum power consumption will be state-dependent. Thus, in the instant embodiment a power consumption will be estimated online by a method for estimating the power consumption of the distributed refrigeration system. Further, optionally, a control of the distributed refrigeration system can be effected once a power reference is provided. The distributed refrigeration system according to a preferred embodiment is described herewith.

In the following a power controller is addressed in general, which power controller may be provided as a local power controller for each cooling entity or a power controller for a refrigeration system RS or a power controller for a supermarket refrigeration system SRS—like e.g. the DERC of FIG. 3 implementing a PCU—or a power controller for a DER. Each of these power controllers, in particular a DERC, or a PCI or a Aggregator A may comprise a PCU with the general function to estimate a total power consumption of a refrigeration system, in particular as depicted in FIG. 6 and FIG. 7

Figure 5:
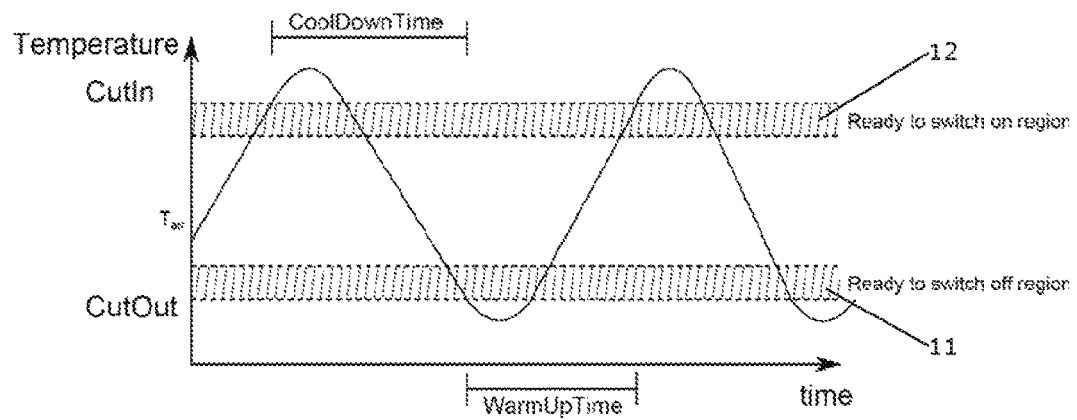
FIG. 5 is a plot of an air temperature within a cooling entity, including the upper and lower temperature constraints; in addition, ready to switch regions are indicated.

FIG. 5 shows a plot of the temperature within in a cooling entity, similar to the plot of FIG. 4. In FIG. 5 a ready to switch off region 11 and a ready to switch on region 12 are marked.

The ready to switch off region 11 is a temperature band which is delimited by the CutOut temperature and a threshold temperature value which is above the CutOut temperature. In the case that the smart-grid setup needs to reduce the power consumption of the power consumers connected to the smart-grid, the aggregator may request power consumption information from the DER, which indicates how much the DER will be able to reduce its current power consumption, or which indicates the lowest possible power consumption of the DER, possibly during a specified time slot. The DER is only able to reduce its power consumption by switching one or more currently active cooling entities to the off state. Therefore, in order to provide the requested power consumption information, the DER identifies the currently active cooling entities, i.e. the cooling entities which are in the on state.

Next, the DER must identify those of the currently active cooling entities, which can safely be switched to the off state. To this end, the DER identifies the cooling entities having an air temperature inside the refrigerated volume, which is close to the CutOut temperature, and which would therefore be switched to the off state shortly anyway. The threshold temperature value which delimits the ready to switch off region 11 indicates how close the temperature inside the refrigerated volume must be to the CutOut temperature in order to determine that the cooling entity is ready to switch off. The exact value of the threshold temperature value could be determined while taking dynamics of the refrigeration system and/or the length of the time slot, which the request from the aggregator refers to, into account. For instance, it may be desirable that only those cooling entities which will not reach the CutIn temperature, and thereby being switched back to the on state, during the time slot, are regarded as being ready to switch off. Thereby it can be ensured that the calculated reduction in power consumption can be maintained during the entire requested time slot.

Similarly, the ready to switch on region 12 is a temperature band which is delimited by the CutIn temperature and a threshold temperature value which is below the CutIn temperature. In the case that the smart-grid setup needs to increase the power consumption of the power consumers connected to the smart-grid, the aggregator may request power consumption information from the DER, which indicates how much the DER will be able to increase its current power consumption, or which indicates the highest possible power consumption of the DER, possibly during a specified time slot. The DER is only able to increase its power consumption by switching one or more of currently inactive cooling entities to the on state. Therefore, in order to provide the requested power consumption information, the DER identifies the currently inactive cooling entities, i.e. the cooling entities which are in the off state.

Next, the DER must identify those of the currently inactive cooling entities, which can safely be switched to the on state. To this end, the DER identifies the cooling entities having an air temperature inside the refrigerated volume, which is close to the CutIn temperature, and which would therefore be switched to the on state shortly anyway. The threshold temperature value which delimits the ready to switch on region 12 indicates how close the temperature inside the refrigerated volume must be to the CutIn temperature in order to determine that the cooling entity is ready to switch on. The exact value of the threshold temperature value could be determined while taking dynamics of the refrigeration system and/or the length of the time slot, which the request from the aggregator refers to, into account. For instance, it may be desirable that only those cooling entities which will not reach the CutOut temperature, and thereby being switched back to the off state, during the time slot, are regarded as being ready to switch on. Thereby it can be ensured that the calculated increase in power consumption can be maintained during the entire requested time slot.

Accordingly, a currently active cooling entity having a temperature inside the refrigerated volume, which is within the ready to switch off region 11 is regarded as being ready to switch off, and a currently inactive cooling entity having a temperature inside the refrigerated volume, which is within the ready to switch on region 12 is regarded as being ready to switch on.

By performing the steps described above for each of the cooling entities of the refrigeration system, and determining the power consumption contribution from each cooling entity, a total possible reduction and/or increase in power consumption of the refrigeration system can be calculated.

FIG. 6 depicts how the power controller of the distributed refrigeration system works for providing the power consumption information in step D of FIG. 6(A).

Figure 6B:
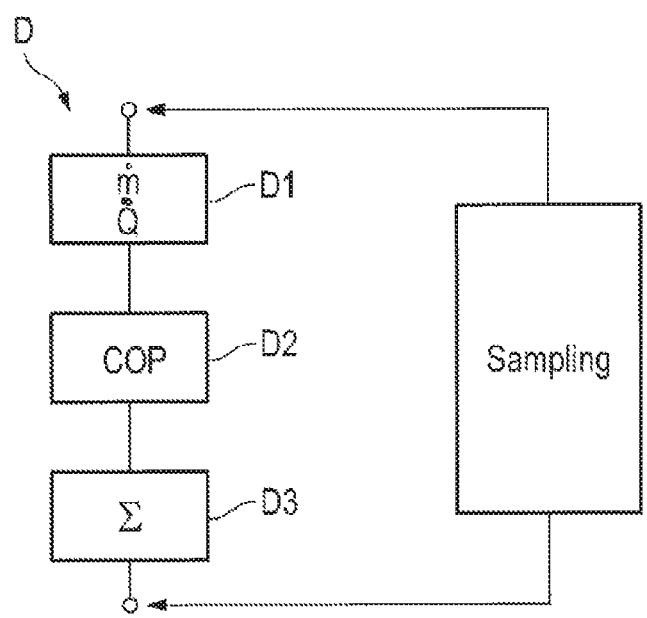
Figure 7:
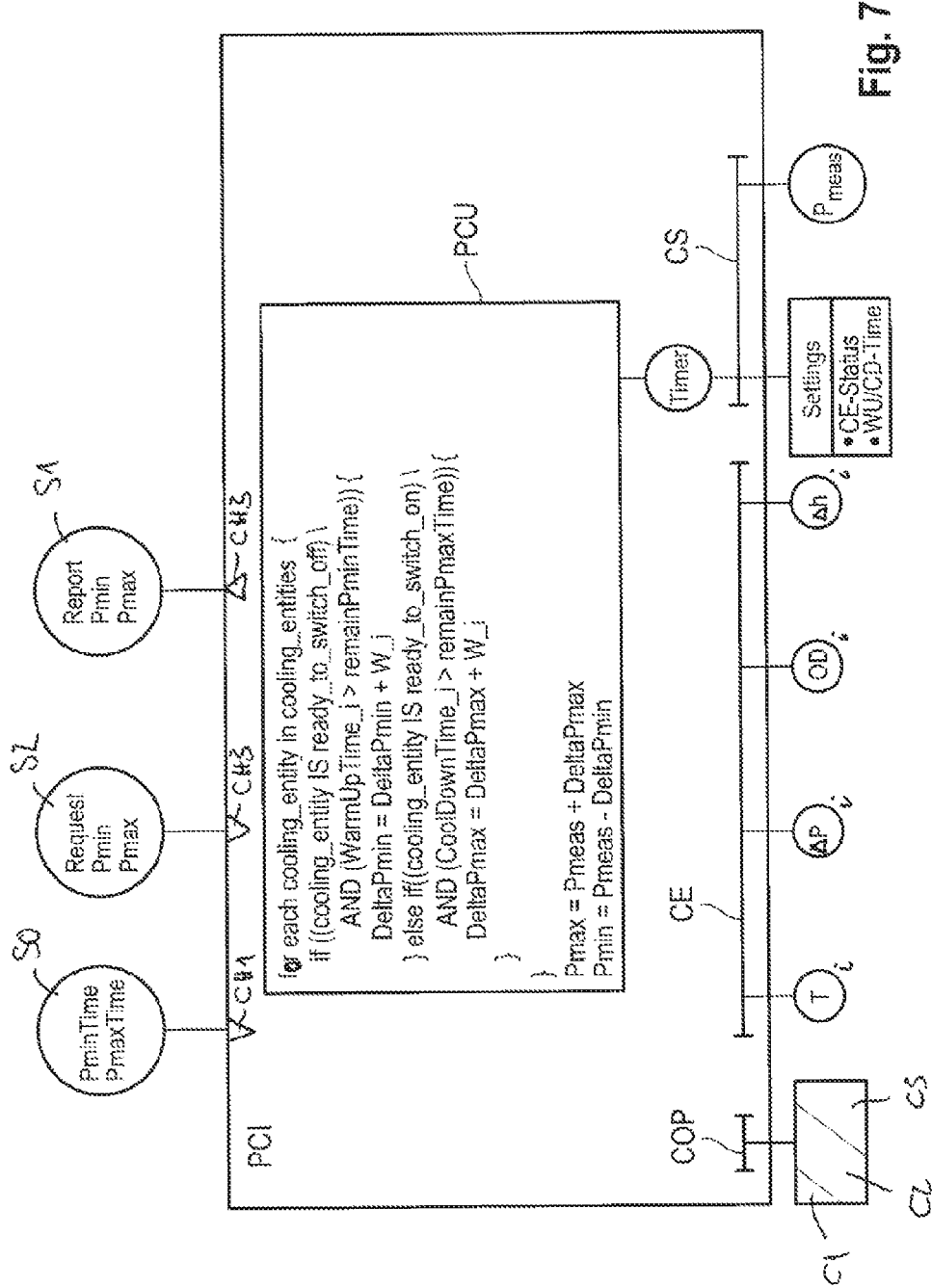
FIG. 7 shows a power controller interface (PCI) for use in a DER (distributed energy resource) comprising a RS (refrigeration system) of FIG. 3 and comprising a module software code section with a pseudo-code shown therein, wherein the pseudo-code describes in a preferred example how to estimate a minimum and maximum power consumption of the distributed refrigeration system of FIG. 3 based on the required time period that the aggregator is asking for minimum and maximum power consumption and in addition the estimation uses all the information created by the power controller as described with FIG. 4 and in addition the exemplifying pseudo-code is based on the empirical knowledge of the warm up and cool down times of each of the cooling entities and the remaining time that the refrigeration system of FIG. 3 should maintain maximum or minimum power consumption, are the estimates calculated.

Generally according to the concept of the invention, a power flexibility margin is provided with a total amount of power consumption $P_{min}$, $P_{max}$ of the refrigeration system 1, wherein according to FIG. 6(B):

a cooling capacity $dQ/dt_i$ of at least one cooling entity is determined D1 and an entity operation condition CE of the cooling entity E1, E2 is taken into account D1;

a power consumption $W_i$ of at least one cooling entity E1, E2 is determined D2 from the cooling capacity $dQ/dt_i$ and a performance estimation COP of a refrigeration cycle for the cooling entity E1, E2 is taken into account D2; and the total amount of power consumption $P_{min}$, $P_{max}$ is provided as a sum of power consumptions $W_i$ of at least the one cooling entity of the number of cooling entities E1, E2, in particular as a sum of relevant power consumptions of the number of cooling entities E1, E2.

More specifically, a majority of the power consumption of a refrigeration system stems from the compressors and the method therefore deals with how the compressor work can be alternated, without compromising the primary temperature and pressure constraints of the refrigeration system. The power consumption of a compressor rack is highly dependent on the mass flow that has to be compressed and the method therefore changes the power consumption of the compressor rack by changing the amount of gas that is received by the compressors. This is effectively done by monitoring each of the cooling entities in the distributed refrigeration system. The power controller keeps track of the temperature with respect to the temperature constraint of the particular entity. In addition, the power controller keeps track to the state of the controller for each of the cooling entities, i.e. is the inlet valve open and thereby decreasing the temperature, or is the valve closed and the temperature therefore increasing. Based on the monitoring of the cooling entities, the power controller decides if the state of the valve can be toggled and thereby assist in either increasing or decreasing the gas send to the compressors and thereby effectively changing the power consumption of the compressors, e.g. as described above with reference to FIG. 5.

By monitoring with step D1 of FIG. 6(B) the opening degree of the inlet valve to the evaporator of each cooling entity an estimate of the cooling capacity of each of the entities can be estimated using to two following equations:

$$\dot{m}_i = OD_i \cdot \alpha \cdot \sqrt{2 \cdot \rho_{suc} \cdot (P_c - P_{suc})} \quad (1)$$

$$\dot{Q}_i = \dot{m}_i \cdot (h_{oe} - h_{oc}) \quad (2)$$

In Equ. (1) the mass flow rate of gas through the inlet valve of a given cooling entity is determined by the opening degree of the inlet valve, the opening degree being denoted by $OD_i$, the orifice constant for the nozzle is denoted by $\alpha$, the density of the gas on the suction side of the compressors is denoted by $\rho_{suc}$ and the pressure in the condenser, i.e. before the inlet valve, and the pressure on the suction side of the compressors are denoted, $P_c$ and $P_{suc}$ respectively. In Equ. (2) the cooling capacity of a given cooling entity is denoted by $dQ/dt_i$, the enthalpy at the outlet of the condenser, i.e. just before the inlet valve, and the enthalpy at the outlet of the evaporator is denoted by $h_{oc}$ and $h_{oe}$, respectively. By using Equ. (1) and Equ. (2) the power controller keeps track of how much cooling capacity every cooling entity is responsible for.

According to step D2 of FIG. 6(B) by using an estimate of the coefficient of performance, COP, the power controller is able to estimate how much power consumption each cooling entity is responsible for using the following equation:

$$W_i = \frac{\dot{Q}_i}{COP} \quad (3)$$

In Equ. (3) the power consumption that a particular cooling entity is responsible for is denoted by $W_i$ and the estimates of the coefficient of performance of the refrigeration cycle is denoted by COP.

According to step D3 at every sample the power controller updates $W_i$ for every cooling entity in the distributed refrigeration system using Equ. (1), Equ. (2) and Equ. (3). For the cooling entities that at the current sample are decreasing the temperature, current values of the opening degrees, OD, are used, and for the cooling entities where thermostat is off at the current sample the opening degree is based on an average opening degree of the particular cooling entity, which is updated when the thermostat is on. The control calculates the desired change in power consumption $\Delta W = W_{ref} - P_{meas}$ by passing a control error "e" according Equ. (4) through a PI-controller to get a more stable control signal.

$$e = W_{ref} - W_m \quad (4)$$

In Equ. (4) the control error is denoted by "e", the power reference and the measured power are denoted by $W_{ref}$ and $W_m$ respectively. However, $W_m$ basically refers to the measured power consumption $P_{meas}$.

Thus, in a control loop a desired change in power consumption ($\Delta W$) is determined as a difference between the power reference ($W_{ref}$) for the requested time and an actual measured power ($P_{meas}$) for a cooling entity of the refrigeration system. The toggling is controlled in particular by an expansion valve of the evaporator. A state of one or more of the cooling entities of the refrigeration system 1 is toggled, in particular by changing a state of an expansion valve, based on a combination of an estimated amount of power consumption ($W_i$) and a desired change in power consumption ($\Delta W$).

In particular when $\Delta W$ and all $W_i$ are calculated, the change of power consumption is achieved by dispatching the cooling entities accordingly. That is, based on the information of the thermostat state of each of the cooling entities and the power consumption that each of them are responsible for, combined with value of AW, the state of the relevant cooling entities are toggled.

FIG. 7 depicts a PCI with a PCU as shown in FIG. 3 in more detail wherein the estimation of minimum and maximum power consumption is processed according to a preferred embodiment.

At first—also referring to FIG. 2—the Power Control Unit PCU is adapted for communicating a power consumption information to a smart grid setup SG, in particular to be communicatively connected to an aggregator A of a smart grid setup SG, the unit comprising:

an input channel for receiving a request S0 of a power consumption information to the refrigeration system, an output channel for transmitting S1 the power consumption information from the refrigeration system 1; the output channel for transmitting is adapted to transmit a lower total amount of power consumption $P_{min}$ of the refrigeration system 1, in particular for a lower activation time $t_{min}$, and/or an upper total amount of power consumption $P_{max}$ of the refrigeration system 1, in particular for an upper activation time $t_{max}$, an input channel for receiving S2, at the refrigeration system 1, a power reference $W_{ref}$ from the smart grid setup SG.

Further the power flexibility margin is provided with a total amount of power consumption $P_{min}$, $P_{max}$ of the refrigeration system 1; wherein—to execute the method of FIG. 6(B)—the Power Control Unit PCU comprises:

a first module for determining D1 a cooling capacity $dQ/dt_i$ of at least one cooling entity and taking into account an entity operation condition E1, E2, . . . , En, of the cooling entity E1, E2, . . . , En;

a second module for determining D2 a power consumption $W_i$ of at least one cooling entity E1, E2, . . . , En, from the cooling capacity $dQ/dt_i$ and taking into account a performance estimation COP of a refrigeration cycle for the cooling entity E1, E2, . . . , En, is taken into account D2;

a third module for providing D3 the total amount of power consumption $P_{min}$, $P_{max}$ as a sum of power consumptions $W_i$ of at least the one cooling entity of the number of cooling entities E1, E2, . . . , En, in particular as a sum of relevant power consumptions of the number of cooling entities E1, E2, . . . , En.

Thus, the estimation of minimum and maximum power consumption of the distributed refrigeration system is based on the required time period that the aggregator is asking for minimum and maximum power consumption. In addition, the estimation uses all the information created by the power controller PCU as shown in FIG. 7.

A Power Control Unit PCU is adapted for operating at least one distributed energy resource comprising a refrigeration system 1 with a number of cooling entities, the unit further comprising:

an operation information base providing an entity operation condition CE of the cooling entity E1, E2, . . . , En;

a performance information base providing a performance estimation (COP) of a refrigeration cycle for the cooling entity E1, E2, . . . , En; and optionally a relevance information base providing a relevance status CS for each of the cooling entities, and optionally, a timer.

The operation information base is adapted to provide at least an opening degree OD; of an inlet valve at the inlet side of the cooling entity cooling entity E1, E2, . . . , En; and/or a pressure drop $\Delta P_i$ from a suction side pressure $P_{suc}$ of a compressor to a pressure side pressure $P_c$ of a compressor of the cooling entity E1, E2, . . . , En.

The performance information base is adapted to provide at least a coefficient of performance COP.

A COP can be provided e.g. on basis of a characteristic curve C1 and/or a look-up table C2 and/or an integral object list C3 (this is an object list of parts with respective parameters of operation) of a refrigeration cycle for a cooling entity E1, E2, . . . , En.

Furthermore a relevance information CS is adapted to provide at least a switch-ON and/or switch-OFF status of operation and/or a status of providing a measurable power consumption, a temperature loop of a cooling entity, in particular a warmup-time in the temperature loop and/or a cooldown-time in the temperature loop.

In particular a ready-to-switch criterium of a thermostat of the cooling entity is verified in that a thermostat state can be switched already on before a temperature of a cooling entity reaches a temperature constraint—e.g. as described above with reference to FIG. 5. More precisely therein a thermostat state can be switched when the temperature of a cooling entity reaches an upper threshold Tu below a CutIn-temperature constraint, for the case an upper total amount of power consumption $P_{max}$ of the refrigeration system 1 is to be increased, and/or a thermostat state can be switched when the temperature of a cooling entity reaches a lower threshold Tl above a CutOut-temperature constraint, for the case a lower total amount of power consumption $P_{min}$ of the refrigeration system 1 is to be decreased.

These conditions are depicted in the 2nd and 5th line of the pseudo-code depicted below.

Preferably estimates are calculated, based on the empirical knowledge of the warm up and cool down times of each of the cooling entities on the one hand and the remaining time that the refrigeration system should maintain maximum or minimum power consumption on the other hand as shown in FIG. 4.

More precisely therein:

in the case, in particular only in that case, a warmup-time in the temperature loop exceeds a lower activation time $t_{min}$, a lower amount of power consumption is relevant for estimation in particular a lower total amount of power consumption $P_{min}$ is estimated as a measured power consumption $P_{meas}$ for the refrigeration system 1 decreased by an estimated minimum change $\Delta P_{min}$ in power consumption, in particular by an accumulated estimated minimum change $\Delta P_{min}$ in power consumption, and/or in the case, in particular only in that case, a cooldown-time in the temperature loop exceeds an upper activation time $t_{max}$, an upper amount of power consumption is relevant for estimation in particular an upper total amount of power consumption $P_{max}$ is estimated as a measured power consumption $P_{meas}$ for the refrigeration system 1 increased by an estimated maximum change $\Delta P_{max}$ in power consumption, in particular by an accumulated estimated maximum change $\Delta P_{max}$ in power consumption.

The idea is, that if the criteria are not fulfilled then the cooling entity has to go to a further temperature loop by switching the thermostat and thus cannot contribute to the estimate as the thermostat has to take at least two states during activation time. The activation times in the pseudo-code herein below are referred to as remainPminTime and remainPmaxTime.

The above conditions are depicted in the 3rd and 6th line of the pseudo-code depicted below.

The following pseudo-code describes the procedure:

```
for each cooling_entity in cooling_entities {
    if((cooling_entity IS ready_to_switch_off) \
        AND (WarmUpTime_i > remainPminTime)){
        DeltaPmin = DeltaPmin + W_i
    }else if((cooling_entity IS ready_to_switch_on) \
        AND (CoolDownTime_i > remainPmaxTime)){
        DeltaPmax = DeltaPmax + W_i
    }
}
Pmax = Pmeas + DeltaPmax
Pmin = Pmeas – DeltaPmin
```

In the pseudo-code above blocks of code is limited by curly brackets, { } and logical tests are limited by parentheses. The backslash, "\", denotes that the expression continues after the line break. The term for each "set member" in "set" describes a for-loop like construction and should be interpreted as follows: The code limited by the following set of curly brackets should be carried out for each member of the set. The if-statement is a normal if-else-construction, meaning that the code within the curly brackets will only be evaluated if the logical test inside the parentheses evaluates to true and if false the else clause will be evaluated. The set denoted cooling entities denotes a set containing all of the cooling entities in the given refrigeration system and each of the members in the set are referred to as cooling_entity. The IS operator checks if the parameters on each side are equal, and the AND operator is a simple logical and operator. The parameter denoted WarmUpTime_i denotes the estimated time for the particular cooling entity to reach its upper temperature constraint. In addition, the parameter, CoolDownTime_i denotes the estimated time for the particular cooling to reach its lower temperature constraint. remainPminTime and remainPmaxTime denote the remaining time that the system is requested to maintain minimum or minimum power consumption, respectively. The change in power consumption that a given cooling entity is responsible for is denoted by W_i and the accumulated change in power consumption is denoted DeltaPmin and DeltaPmax, depending upon if it denoted a decrease or an increase in power consumption. The parameters Pmin and Pmax denote the absolute values of the estimated minimum and maximum power consumption, respectively, and Pmeas denotes the measured power consumption of the refrigeration system. The notation_i is introduced to highlight that the particular variable is connected to the i_th cooling entity, i.e. the cooling entity with number "i" selected from the number of "n" cooling entities, wherein i=1 . . . n.

Further referring to FIG. 7 in view of FIG. 4 and FIG. 5—in a more general description—the pseudo code is an algorithm for e.g. calculating the maximum energy (assigned to Pmax) that can be consumed by a refrigeration system 1 comprising a number "n" of cooling entities (e.g. E1, E2) for a given time span (assigned generally to activation time or remainPminTime, remainPmaxTime); the time span starting when the request by the aggregator A of step S2 was made. Likewise this is the case for calculating the minimum energy that the refrigeration system can run with.

The first IF sentence in line 2 of the pseudo-code is used to identify those cooling entities E_i that can be switched off and thereby contribute to reducing the consumed energy of the system. The condition "cooling_entity IS ready_to_switch_off" expresses that it needs to be clarified whether an entity can be switched of. One (but not the only) possibility to decide this is, that firstly an entity is ready to be switch off when the inlet valve is active; i.e. the inlet valve is in state where it permits refrigerant to enter an evaporator of the entity. Secondly the temperature in the cooling entity is below a threshold Tl laying above CutOut, but above CutOut. Those entities that fulfill the condition provide the entities that can be switched off and have a rather low temperature.

This does not yet clarify if the temperature is sufficiently low, so that the thermodynamics of the entities means that an entity will stay at a temperature that is below CutIn for the remainder of the time span (assigned generally to activation time or remainPminTime, remainPmaxTime) for which the request was made, if the cooling entity is switched off. This is clarified by the second condition in line 3 of the pseudo-code "WarmUpTime_i>remainPminTime" in the first IF sentence.

Vice versa an entity where the condition is not fulfilled has a thermodynamic where it is expected that the time it takes to warm up the entity is shorter than what is left of the requested time span. In a simplifying manner the cooling entity so to say warms up too fast and it will reach a CutIn-temperature too fast. This means it will reach a CutIn-temperature so fast that the entity needs cooling (i.e. the inlet valve will become active) before the remainder of the requested time span has expired.

On the other hand, those entities that fulfill said condition warm up so slowly that it is expected that the entities do not need cooling during the remainder of the requested time span; namely because their temperature does not reach a CutIn-temperature, during this time interval.

Those entities that fulfill the two condition in the first IF sentence are those that can stay switched-off for the time span and thereby contribute to keep $P_{min}$ low. Consequently, as assumed by this embodiment, to sum up only of those entities where the temperature is sufficiently low and where the thermodynamics of the entity are sufficiently slow will be able to stay switched off for the requested time span; all others will need cooling before the requested time span has elapsed.

Further, it is observed in this embodiment, that each entity has different thermodynamics. That is determined amongst others by the nature of what the entity is cooling and how much it cools. The pseudo code considers this condition in that an individual WarmUpTime_i for each cooling entity E_i of the number of "n" entities is denoted by a numeral i. The individual WarmUpTime_i is determined based on each entities cooling cycle and will in principle vary over time as goods are entering the entity and are removed from the cooling entity E_i.

In summary the general principle of the above explanation of the first part of the pseudo code is that any cooling entity E_i that within the requested time span does not need cooling (the temperature of the entity stays below CutIn) can be switched off, thereby contributing to decreasing a total power consumption of the refrigeration system.

Further, vice versa the general principle of the second part of the pseudo code is that any cooling entity E_i that within the requested time span can accept receiving cooling (the temperature of the entity stays above CutOut) can be switched on. Thus, with the second IF sentence of the pseudo-code in lines 5 and 6 thereof are those entities identified that are able of consume energy for the requested time span—the details of conditions thus are vice versa as compared to the first part of the pseudo code.

The above approach is one way of determining the relevant entities and a rather conservative approach, meaning that the number of entities E_i that can be switched off in reality could be higher, by a different and/or less conservative approach.

Clauses

1. Method of operating at least one distributed energy resource comprising a refrigeration system (1) with a number of cooling entities, wherein a power consumption information is communicated to a smart-grid setup (SG) and the method comprises the steps of:
   requesting (S0) a power consumption information from the refrigeration system;
   transmitting (S1) the power consumption information from the refrigeration system (1), wherein a total amount of power consumption (Pmin, Pmax) of the refrigeration system (1) is provided; wherein:
   a cooling capacity (dQ/dt_i) of at least one cooling entity is determined wherein an entity operation condition (CE) of the cooling entity (E1, E2) is taken into account (D1);
   a power consumption (W_i) of at least one cooling entity (E1, E2) is determined from the cooling capacity (dQ/dt_i) wherein a performance estimation (COP) of a refrigeration cycle for the cooling entity (E1, E2) is taken into account (D2);
   providing (D3) the total amount of power consumption (Pmin, Pmax) as a sum of power consumptions (W_i) of at least the one cooling entity of the number of cooling entities (E1, E2), in particular as a sum of relevant power consumptions of the number of cooling entities (E1, E2),
   receiving (S2) at the refrigeration system (1) a power reference (Wref) from the smart-grid setup (SG).

2. Method as defined in clause 1 characterized in that communicating the power consumption information and/or transmitting (S1) the power consumption information and/or receiving (S2) a power reference (Wref) at the refrigeration system (1) is to/from an aggregator (A) of a smart-grid setup (SG).

3. Method as defined in clause 1 or 2 characterized in that the power reference (Wref) is adapted to a power flexibility margin in that
   the power consumption information is requested (S0) for a requested time (t) from the refrigeration system (1), and
   (S1) the provided total amount of power consumption (Pmin, Pmax) of the refrigeration system (1) is for a providing-time (tmin, tmax) of a total amount of power consumption (Pmin, Pmax), wherein the providing-time (tmin, tmax) is the same as the requested time (t).

4. Method as defined in one or more of clauses 1 to 3 characterized in that the total amount of power consumption of the refrigeration system (1) for the requested time is provided as an upper total amount of power consumption (Pmax), in particular as an upper total amount of power consumption (Pmax) for an upper activation time (tmax).

5. Method as defined in one or more of clauses 1 to 4 characterized in that the total amount of power consumption of the refrigeration system (1) for the requested time is provided as a lower total amount of power consumption (Pmin), in particular as a lower total amount of power consumption (Pmin) for a lower activation time (tmin).

6. Method as defined in one or more of clauses 3 to 5 characterized in that the power reference (Wref) is adapted to the power flexibility margin such that
   the power reference (Wref) is below an upper total amount of power consumption (Pmax) and/or above a lower total amount of power consumption (Pmin),
   in particular the power reference (Wref) is below an upper total amount of power consumption (Pmax) and above a measured power consumption (Pmeas) for the refrigeration system (1) and/or above a lower total amount of power consumption (Pmin) and below a measured power consumption (Pmeas) for the refrigeration system (1).

7. Method as defined in one or more of clauses 1 to 6 characterized in that a lower total amount of power consumption (Pmin) of the refrigeration system (1), in particular for a lower activation time (tmin), is provided as a measured power consumption (Pmeas) for the refrigeration system (1) diminished by an estimated, in particular accumulated, lower change (DeltaPmin) in power consumption.

8. Method as defined in one or more of clauses 1 to 7 characterized in that an upper total amount of power consumption (Pmax) of the refrigeration system (1), in particular for an upper activation time (tmax), is provided as a measured power consumption (Pmeas) for the refrigeration system (1) increased by an estimated, in particular accumulated, upper change (DeltaPmax) in power consumption.

9. Method as defined in one or more of clauses 1 to 8 characterized in that
the cooling capacity (dQ/dt) is provided by monitoring each of the cooling entities, wherein:
a mass flow rate (dm/dt) of gas at the inlet side of the cooling entity is determined, in particular is determined via monitoring the mass flow rate of each of the cooling entities on the suction side of a compressor, and
a cooling enthalpy ($\Delta h$=hoe−hoc) over the cooling entity is determined, in particular is determined via monitoring the cooling enthalpy over each of the cooling entities between a condenser and evaporator.

10. Method as defined in clause 9 characterized in that the mass flow rate (dm/dt) is determined at least on basis of
an opening degree (OD_i) of an inlet valve at the inlet side of the cooling entity (E1, E2) and/or
a pressure drop ($\Delta P$=Pc−Psuc) between a pressure side pressure (Pc) of a compressor of the cooling entity (E1, E2) and a suction side pressure (Psuc) of the compressor, in particular a pressure drop ($\Delta P$=Pc−Psuc) from a condenser pressure (Pc) to a suction side compressor pressure (Psuc).

11. Method as defined in one or more of clauses 1 to 10 characterized in that (D2) a performance estimation (COP) of the refrigeration cycle for the cooling entity (E1, E2) is taken into account as a functional, in particular proportional, relationship between the cooling capacity (dQ/dt_i) and the power consumption (W_i),
in particular, wherein the functional relationship between the cooling capacity (dQ/dt_i) and the power consumption (W_i) is given by a proportional relationship, wherein the performance estimation (COP) of the refrigeration cycle is collected by a coefficient of performance of the refrigeration cycle and/or a cooling entity,
in particular, wherein the performance estimation (COP) mainly addresses the relation of a cooling capacity (dQ/dt_i) relative to a compressor power consumption.

12. Method as defined in one or more of clauses 1 to 11 characterized in that the total amount of power consumption (Pmin, Pmax) is provided as a sum of only those power consumptions (W_i), which are relevant of at least the one cooling entity of the number of cooling entities (E1, E2), wherein the sum is performed by sampling the cooling entities and processing a relevance status for each of the cooling entities with regard to a temperature loop of a cooling entity.

13. Method as defined in one or more of clauses 1 to 12 characterized in that a ready-to-switch criterium of a thermostat of the cooling entity is verified in that a thermostat state can be switched already on before a temperature of a cooling entity reaches a temperature constraint, wherein
a thermostat state can be switched when the temperature of a cooling entity reaches an upper threshold below a CutIn-temperature constraint when an upper total amount of power consumption (Pmax) of the refrigeration system (1) is to be increased, and/or
a thermostat state can be switched when the temperature of a cooling entity
reaches a lower threshold above a CutOut-temperature constraint when a lower total amount of power consumption (Pmin) of the refrigeration system (1) is to be decreased.

14. Method as defined in one or more of clauses 1 to 13 characterized in that
in the case, in particular only in that case, a warmup-time in the temperature loop exceeds a lower activation time (tmin), a lower amount of power consumption is relevant for estimation
in particular a lower total amount of power consumption (Pmin) is estimated as a measured power consumption (Pmeas) for the refrigeration system (1) decreased by an estimated minimum change (DeltaPmin) in power consumption, in particular by an accumulated estimated minimum change (DeltaPmin) in power consumption, and/or
in the case, in particular only in that case, a cooldown-time in the temperature loop exceeds an upper activation time (tmax), an upper amount of power consumption is relevant for estimation
in particular an upper total amount of power consumption (Pmax) is estimated as a measured power consumption (Pmeas) for the refrigeration system (1) increased by an estimated maximum change (DeltaPmax) in power consumption, in particular by an accumulated estimated maximum change (DeltaPmax) in power consumption.

15. Method as defined in one or more of clauses 1 to 14 characterized in that in a control loop a desired change in power consumption (DeltaW) is determined as a difference between the power reference (Wref) for the requested time and an actual measured power consumption (Pmeas) for a cooling entity of the refrigeration system and a state of one or more of the cooling entities of the refrigeration system (1) is toggled by change of an inlet valve, based on a combination of an estimated amount of power consumption (W_i) and a desired change in power consumption (DeltaW).

16. Power Control Unit (PCU) adapted for communicating a power consumption information to a smart-grid setup (SG), in particular to be communicatively connected to an aggregator (A) of a smart-grid setup (SG), in particular to execute the method steps of one of clauses 1 to 15, the unit comprising:
an input channel (CH1) for receiving a request (S0) of a power consumption information from the refrigeration system, in particular an input channel (CH1) to the aggregator (A);
an output channel (CH2) for transmitting (S1) the power consumption information from the refrigeration system (1), wherein a total amount of power consumption (Pmin, Pmax) of the refrigeration system (1) is provided, in particular an output channel (CH2) to the aggregator (A); wherein:
a first module for determining (D1) a cooling capacity (dQ/dt_i) of at least one cooling entity (D1) and taking into account an entity operation condition (E1, E2) of the cooling entity (E1, E2);

a second module for determining (D2) a power consumption (W_i) of at least one cooling entity (E1, E2) from the cooling capacity (dQ/dt_i) and taking into account a performance estimation (COP) of a refrigeration cycle for the cooling entity (E1, E2);

a third module for providing (D3) the total amount of power consumption (Pmin, Pmax) as a sum of power consumptions (W_i) of at least the one cooling entity of the number of cooling entities (E1, E2), in particular as a sum of relevant power consumptions of the number of cooling entities (E1, E2), an input channel for receiving (S2) at the refrigeration system (1) a power reference (Wref) from the smart-grid setup (SG).

17. A Power Control Unit (PCU), in particular as defined in clause 16, adapted for operating at least one distributed energy resource comprising a refrigeration system (1) with a number of cooling entities, in particular to execute the method steps of one of clauses 1 to 15, the unit further comprising:

an operation information base providing an entity operation condition (CE) of the cooling entity (E1, E2);

a performance information base providing a performance estimation (COP) of a refrigeration cycle for the cooling entity (E1, E2); and optionally a relevance information base providing a relevance status (CS) for each of the cooling entities, and optionally a timer.

18. A Power Control Unit (PCU) as defined in clause 16 or 17 characterized in that the output channel for transmitting is adapted to transmit
  a lower total amount of power consumption (Pmin) of the refrigeration system (1), in particular for a lower activation time (tmin), and/or
  an upper total amount of power consumption (Pmax) of the refrigeration system (1)), in particular for an upper activation time (tmax), the input channel for receiving is adapted to receive a power reference (Wref) from the smart-grid setup (SG), and/or an operation information base is adapted to provide
  an opening degree (OD_i) of an inlet valve at the inlet side of the cooling entity (E1, E2) and/or
  a pressure drop (ΔP=Pc−Psuc) between a pressure side pressure (Pc) of a compressor of the cooling entity (E1, E2) and a suction side pressure (Psuc) of the compressor, in particular a pressure drop (ΔP=Pc−Psuc) from a condenser pressure (Pc) to a suction side compressor pressure (Psuc);

performance information base is adapted to provide at least a coefficient of performance (COP), and/or a characteristic curve and/or a look-up table and/or an object list of a refrigeration cycle for the cooling entity;

a relevance information is adapted to provide a relevance status for each of the cooling entities with regard to a temperature loop of a cooling entity.

19. A System of a Power Control Unit (PCU) as defined in clause 16 or 17 implemented in an entity selected from the group of entities comprising:

an Aggregator (A), a Distributed Energy Resource Controller (DERC), adapted for operating at least one distributed energy resource comprising a refrigeration system (1) with a number of cooling entities, a distributed energy resource comprising a refrigeration system (1) with a number of cooling entities a Power Controller Interface (PCI) between the Aggregator (A) and the Distributed Energy Resource Controller (DERC).

20. Smart-Grid setup (SG) comprising an Electrical Grid Operator (EGO) and an Aggregator (A) for connection to a Market Place (MP) assigned to the Electrical Grid, wherein the Aggregator (A) and a number of Distributed Energy Resources (DER) are communicatively connected via a Power Controller Unit (PCU) as defined in clause 16 or 17.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A method for operating at least one distributed energy resource comprising a refrigeration system with at least one compressor, at least one heat rejecting heat exchanger, and two or more cooling entities, each cooling entity comprising an evaporator and an expansion valve controlling a supply of refrigerant to the evaporator, the method comprising the steps of:

a smart-grid setup requesting information regarding expected minimum power consumption and/or expected maximum power consumption of the refrigeration system during a defined future time interval, from the distributed energy resource, for each of the cooling entities, a controller of the distributed energy resource estimating a power consumption contribution originating from the cooling entity, for each of the cooling entities, the controller of the distributed energy resource determining whether the cooling entity is in a state in which the evaporator of the cooling entity receives refrigerant or in a state in which the evaporator of the cooling entity is not receiving refrigerant, and determining whether or not the cooling entity is ready to switch state based on predefined operation criteria, the controller of the distributed energy resource calculating an expected minimum power consumption and/or an expected maximum power consumption of the refrigeration system during the defined future time interval, based on the estimated power consumption contributions of the cooling entities, and based on the determined states of the cooling entities and whether or not the cooling entities are ready to switch state, the controller of the distributed energy resource transmitting the calculated expected minimum power consumption and/or expected maximum power consumption of the refrigeration system to the smart-grid setup, the smart-grid setup transmitting a power reference to the distributed energy resource, the power reference being within a power interval defined by the transmitted expected minimum power consumption and/or expected maximum power consumption, and the distributed energy resource controlling the cooling entities using the power reference received from the smart-grid setup as a setpoint value for the power consumption of the refrigeration system, during the defined time interval.

2. The method according to claim 1, further comprising the step of, for each of the cooling entities, the controller of the distributed energy resource estimating a cooling capacity of the cooling entity, and wherein the step of, for each of the cooling entities, estimating a power consumption contribution originating from the cooling entity is based on the estimated cooling capacity of the cooling entity.

3. The method according to claim 2, wherein the step of, for each of the cooling entities, estimating a cooling capacity of the cooling entity is based on an opening degree of the expansion valve, and on measured values of pressure and temperature of the refrigerant.

4. The method according to claim 3, wherein the step of, for each of the cooling entities, estimating a power consumption contribution originating from the cooling entity is based on a coefficient of performance of the refrigeration cycle of the refrigeration system.

5. The method according to claim 3, wherein the step of controlling the cooling entities comprises controlling the cooling entities on the basis of the estimated power consumption contribution of the cooling entities, and on the basis of the determined states of the cooling entities and whether or not the cooling entities are ready to switch state.

6. The method according to claim 3, wherein the step of the distributed energy resource controlling the cooling entities comprises switching state of one or more of the cooling entities being ready to switch state.

7. The method according to claim 2, wherein the step of, for each of the cooling entities, estimating a power consumption contribution originating from the cooling entity is based on a coefficient of performance of the refrigeration cycle of the refrigeration system.

8. The method according to claim 2, wherein the step of controlling the cooling entities comprises controlling the cooling entities on the basis of the estimated power consumption contribution of the cooling entities, and on the basis of the determined states of the cooling entities and whether or not the cooling entities are ready to switch state.

9. The method according to claim 2, wherein the step of the distributed energy resource controlling the cooling entities comprises switching state of one or more of the cooling entities being ready to switch state.

10. The method according to claim 1, wherein the step of, for each of the cooling entities, estimating a power consumption contribution originating from the cooling entity is based on a coefficient of performance of the refrigeration cycle of the refrigeration system.

11. The method according to claim 10, wherein the step of controlling the cooling entities comprises controlling the cooling entities on the basis of the estimated power consumption contribution of the cooling entities, and on the basis of the determined states of the cooling entities and whether or not the cooling entities are ready to switch state.

12. The method according to claim 10, wherein the step of the distributed energy resource controlling the cooling entities comprises switching state of one or more of the cooling entities being ready to switch state.

13. The method according to claim 1, wherein the step of controlling the cooling entities comprises controlling the cooling entities on the basis of the estimated power consumption contribution of the cooling entities, and on the basis of the determined states of the cooling entities and whether or not the cooling entities are ready to switch state.

14. The method according to claim 13, wherein the step of the distributed energy resource controlling the cooling entities comprises switching state of one or more of the cooling entities being ready to switch state.

15. The method according to claim 1, wherein the step of the distributed energy resource controlling the cooling entities comprises switching state of one or more of the cooling entities being ready to switch state.

16. The method according to claim 1, wherein the smart-grid setup comprises an aggregator, and wherein the step of the smart-grid setup requesting information regarding expected minimum power consumption and/or expected maximum power consumption and/or the step of the smart-grid setup transmitting a power reference is/are performed by the aggregator.

17. The method according to claim 1, wherein the step of transmitting the calculated expected minimum power consumption and/or expected maximum power consumption comprises transmitting a maximum power consumption, and wherein the power reference transmitted by the smart-grid setup is below the maximum power consumption.

18. The method according to claim 1, wherein the step of transmitting the calculated expected minimum power consumption and/or expected maximum power consumption comprises transmitting a minimum power consumption, and wherein the power reference transmitted by the smart-grid setup is above the minimum power consumption.

19. The method according to claim 1, wherein the step of, for each of the cooling entities, the controller of the distributed energy resource determining whether the cooling entity is in a state in which the evaporator of the cooling entity receives refrigerant or in a state in which the evaporator of the cooling entity is not receiving refrigerant, and determining whether or not the cooling entity is ready to switch state comprises the steps of, for each of the cooling entities:

determining whether the cooling entity is in an on state, in which refrigerant is supplied to the evaporator, or in an off state, in which no refrigerant is supplied to the evaporator, obtaining a temperature inside a refrigerated volume being cooled by means of the evaporator of the cooling entity, in the case that the cooling entity is in an on state, comparing the obtained temperature to a cut-out temperature of the predefined operation criteria for the cooling entity, and determining that the cooling entity is ready to switch state if the difference between the obtained temperature and the cut-out temperature is below a first threshold value of the predefined operation criteria, and in the case that the cooling entity is in an off state, comparing the obtained temperature to a cut-in temperature of the predefined operation criteria for the cooling entity, and determining that the cooling entity is ready to switch state if the difference between the obtained temperature and the cut-in temperature is below a second threshold value of the predefined operation criteria.

20. The method according to claim 19, wherein the first threshold value and/or the second threshold value is/are selected in accordance with a length of the defined future time interval.

* * * * *